United States Patent
Sharp

(10) Patent No.: US 9,933,636 B2
(45) Date of Patent: Apr. 3, 2018

(54) OPTICAL FILTER WITH COLOR ENHANCEMENT

(71) Applicant: Gary D. Sharp, Boulder, CO (US)

(72) Inventor: Gary D. Sharp, Boulder, CO (US)

( * ) Notice: Subject to any disclaimer, the term of this patent is extended or adjusted under 35 U.S.C. 154(b) by 0 days.

(21) Appl. No.: 15/331,245

(22) Filed: Oct. 21, 2016

(65) Prior Publication Data

US 2017/0139234 A1 May 18, 2017

Related U.S. Application Data

(60) Provisional application No. 62/245,882, filed on Oct. 23, 2015.

(51) Int. Cl.
| | |
|---|---|
| *G02C 7/12* | (2006.01) |
| *G02B 27/28* | (2006.01) |
| *G02B 5/30* | (2006.01) |
| *G02C 7/10* | (2006.01) |

(52) U.S. Cl.
CPC ............ *G02C 7/12* (2013.01); *G02B 5/3083* (2013.01); *G02B 27/288* (2013.01); *G02C 7/104* (2013.01)

(58) Field of Classification Search
None
See application file for complete search history.

(56) References Cited

U.S. PATENT DOCUMENTS

| | | |
|---|---|---|
| 2006/0285033 A1 | 12/2006 | Sharp et al. |
| 2007/0252991 A1 | 11/2007 | Gerhart et al. |
| 2007/0296958 A1 | 12/2007 | Zou et al. |
| 2012/0293747 A1 | 11/2012 | Sharp et al. |

FOREIGN PATENT DOCUMENTS

WO      2007082202      7/2007

OTHER PUBLICATIONS

International Search Report for International Application No. PCT/US2016/058233, dated Dec. 19, 2016.

*Primary Examiner* — Ricky Mack
*Assistant Examiner* — Journey Sumlar
(74) *Attorney, Agent, or Firm* — Robert G. Crouch; Marsh Fishmann & Breyfogle LLP

(57) ABSTRACT

An eyewear lens is described that provides polarization filtering and spectral filtering using polarization interference. The lens produces enhanced saturation and colorfulness, increasing enjoyment when observing commonly encountered imagery. The lens can be configured to optimize accuracy/efficiency when performing a task involving colored imagery, and can improve performance in sports. The lens can further be helpful for color discrimination by those with certain types of color vision deficiency.

27 Claims, 13 Drawing Sheets

OPTICAL FILTER WITH COLOR ENHANCEMENT

This application claims the benefit of U.S. Provisional Application No. 62/245,882, filed Oct. 23, 2015, the entire contents of which is incorporated herein by reference.

BACKGROUND

Polarization has become a commonplace functional requirement for reducing uncomfortable glare in eyewear lenses. Spectral filtering using dyes and dichroic coatings is also commonplace for reducing luminance and shifting hue, each with performance limitations.

It has been attempted previously to enhance vision with eyewear that includes a polarization interference filter, as exemplified in U.S. Pat. No. 7,106,509. From a practical standpoint, the filters disclosed therein are overly complex with multiple layers of retardation that create multiple output impulses from a polarized input pulse. The necessity of the many impulses is to filter in the spectral cyan, the spectral yellow, or both, while efficiently transmitting other wavelengths. Such an eyewear filter with acceptable angular color uniformity would require a minimum of six to ten retarder films using available uniaxial materials. For the seven-layer example given therein, the retarder stack would require a minimum of 21 layers, which would be impractical for an eyewear product.

What is needed, therefore, are improved techniques for spectral filtering in eyewear lenses.

SUMMARY

The disclosure herein relates to using polarization interference filtering to achieve a simple and easily-produced color enhancement filter. The color enhancement filter may have a series of peaks and valleys that are selected for color enhancement.

In one aspect, an eyewear lens includes a lens having a spectral transmission with a sinusoidal shape having a peak at each of the colors of long-wavelength blue, green, and red and a valley at each of the colors of high-energy blue, cyan, and yellow/orange.

Long-wavelength blue may be in the wavelength range of 455-480 nm, green may be in the wavelength range of 520-555 nm, red may be in the wavelength range of 610-680 nm, high-energy blue may be in the wavelength range of 400-450 nm, cyan may be in the wavelength range of 485-515 nm, and yellow/orange may be in the wavelength range of 565-590 nm. The transmission at the peaks may be greater than four times the transmission at the valleys. The transmission at the peaks may be greater than ten times the transmission at the valleys.

In another aspect, an eyewear lens includes a stack of layers, which include a first protective substrate; a polarizer; a retarder stack that generates only two output impulses from a polarized impulse input, wherein the retarder stack provides four to six waves of retardation in the green wavelength range; a second polarizer; and a second protective substrate.

The retarder stack may have been wide-fielded by including a pair of multi-order retarders that are placed with their respective optic axes orthogonal to each other and the pair of multi-order retarders are separated by one or more zero-order half-wave plates. The retarder stack may provide five to five and one-half waves of retardation in the green wavelength range.

In another aspect, a clip-on lens for wearing over a polarized eyewear lens, the clip-on lens includes a stack of layers, including a first protective substrate; a first polarizer; a retarder stack that generates only two output impulses from a polarized impulse input, wherein the retarder stack provides four to six waves of retardation in the green wavelength range; and a second protective substrate.

Another aspect relates to an optical filter that includes a polarization interference filter (PIF), including at least: an input polarizer; one or more retarders; and an output polarizer. The PIF has a transmission across the 400 nm to 700 nm spectrum that is substantially sinusoidal having minimums and maximums, and with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

Another aspect relates to an optical filter that includes a polarization interference filter (PIF), including at least: an input polarizer; one or more retarders; and an output polarizer. The PIF has a transmission across the 400 nm to 700 nm spectrum that is substantially sinusoidal having minimums and maximums, and with a single maximum in the 555 nm to 610 nm range, a single maximum in the 400 nm to 480 nm range, and at least one minimum in the 480 nm to 515 nm range.

The optical filter may provide color enhancement to a person with color vision deficiency.

Another aspect relates to an optical filter that includes a polarization interference filter (PIF), including at least: an input polarizer having an axis of polarization at a first angle; an input chromatic uniaxial retarder with an optical axis that is offset by +45 degrees from the first angle, and having a retardance value of Γ; a pair of zero-order have-wave retarders forming an achromatic rotator, with angles of substantially +21.5 degrees and substantially −21.5 degrees therebetween; an output chromatic uniaxial retarder with an optical axis that is offset by −45 degrees from the first angle, and having a retardance value of Γ; and an output polarizer having an axis of polarization at a second angle that is either parallel to or perpendicular to the first angle. The optical filter has a wide field of view with a Δxy color shift at 30 degrees off-axis of 0.05 or less.

The PIF may have a transmission across the 400 nm to 700 nm spectrum that is substantially sinusoidal having minimums and maximums, and with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

Another aspect relates to an optical filter that includes an input polarizer; an input chromatic retarder; an output chromatic retarder; a neutral Polarization Control Unit (PCU) therebetween, including one or more zero-order half-wave uniaxial retarders, wherein the polarization transformation by the PCU creates a net chromatic retardation that is substantially independent of angle-of-incidence; and an output polarizer. The filter may have a transmission across the 400 nm to 700 nm spectrum with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 450 nm to 450 nm range.

The input and output polarizers may have parallel axes of polarization, wherein the chromatic retarders are composed of polycarbonate and each have a retardance (Γ) of 2.25 waves in the 505 nm to 555 nm range, and wherein the PCU provides rotation about an axis in the range of −19 to −24 degrees and an axis in the range of +19 to +24 degrees. The PCU may include an odd number of half-wave retarders. The PCU may be a single half-wave retarder with the slow and fast axes of the retarder aligned at 0 degrees and 90 degrees with the orientation of a polarization axis of the input polarizer. The PCU may be a compound half-wave retarder with three retarder layers and with the fast axis of: a first of the three retarder layers oriented at −30 degrees with an orientation of a polarization axis of the input polarizer, a second of the three retarder layers oriented at +30 degrees with the orientation of the polarization axis of the input polarizer, and a third of the three retarder layers oriented at −30 degrees with the orientation of the polarization axis of the input polarizer.

Another aspect relates to an optical filter that includes an input polarizer; one or more chromatic retarders; and an analyzing polarizer. At least one of the polarizers has a chromatic polarizing efficiency to increase the transmission of one or more spectral bands relative to one or more other spectral bands.

The analyzing polarizer may have a relatively lower polarizing efficiency in the 610 nm to 700 nm range than in the 400 nm to 610 nm range. The polarizers may have axes of polarization that are perpendicular to each other; and wherein the optical filter further includes a Polarization Control Unit (PCU), including one or more zero-order half-wave uniaxial retarders.

Another aspect relates to an optical filter that includes a polarization interference filter (PIF), including at least: an input polarizer; a retarder stack that generates only two output impulses from a polarized impulse input; and an output polarizer. The PIF has a transmission across the 400 nm to 700 nm spectrum with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

Any combination of any of the following may be added to any of the above aspects, and thus may related to PIFs, color enhancement filters, or other optical filters. A substantially neutral white-point may be achieved. Each of the minimums in the transmission spectrum may be less than 20% of each of maximums. There may be at least one minimum in the 700 nm to 1400 nm range. At least one retarder in the retarder stack may include solvent bonded retarder films. At least one retarder in the retarder stack may include at least one uniaxial stretched retarder film. The film may include polycarbonate. The film may include polyolefin. At least one of the polarizers may include a chromatic dye that controls a color balance and overall hue of the optical filter.

The optical filter may be arranged as a laminated stack of layers. The polarizers may include polyvinyl alcohol. The retarder stack may be formed on glass. The retarder stack may be formed on isotropic plastic. Each of the layers of the laminated stack may lie substantially in their own plane. Each of the layers of the laminated stack may be curved. Each of the components of the optical filter may be thermoformed.

The optical filter may be arranged for use by a person having color vision deficiency. The optical filter may be arranged for use as a sunglass lens. The optical filter may be arranged for filtering light before it is captured electronically. The optical filter may be arranged as part of a display that displays images. The optical filter may be arranged for filtering light provided to a human performing an activity.

Long-wavelength blue may be in the wavelength range of 455-480 nm, green may be in the wavelength range of 520-555 nm, red may be in the wavelength range of 610-680 nm, high-energy blue may be in the wavelength range of 400-450 nm, cyan may be in the wavelength range of 485-515 nm, and yellow/orange may be in the wavelength range of 565-590 nm. The transmission at the peaks may be greater than four times the transmission at the valleys. The transmission at the peaks may be greater than ten times the transmission at the valleys.

The retarder stack may have been wide-fielded by including a pair of multi-order retarders that are placed with their respective optic axes orthogonal to each other and the pair of multi-order retarders are separated by one or more zero-order half-wave plates. The retarder stack may provide five to five and one-half waves of retardation in the green wavelength range.

The PIF may have a transmission across the 400 nm to 700 nm spectrum that is substantially sinusoidal having minimums and maximums, and with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

The input and output polarizers may have parallel axes of polarization, wherein the chromatic retarders are composed of polycarbonate and each have a retardance (Γ) of 2.25 waves in the 505 nm to 555 nm range, and wherein the PCU provides rotation about an axis in the range of −19 to −24 degrees and an axis in the range of +19 to +24 degrees. The PCU may include an odd number of half-wave retarders. The PCU may be a single half-wave retarder with the slow and fast axes of the retarder aligned at 0 degrees and 90 degrees with the orientation of a polarization axis of the input polarizer. The PCU may be a compound half-wave retarder with three retarder layers and with the fast axis of: a first of the three retarder layers oriented at −30 degrees with an orientation of a polarization axis of the input polarizer, a second of the three retarder layers oriented at +30 degrees with the orientation of the polarization axis of the input polarizer, and a third of the three retarder layers oriented at −30 degrees with the orientation of the polarization axis of the input polarizer.

The analyzing polarizer may have a relatively lower polarizing efficiency in the 610 nm to 700 nm range than in the 400 nm to 610 nm range. The polarizers may have axes of polarization that are perpendicular to each other; and wherein the optical filter further includes a Polarization Control Unit (PCU), including one or more zero-order half-wave uniaxial retarders.

DETAILED DESCRIPTION

Figure 1:
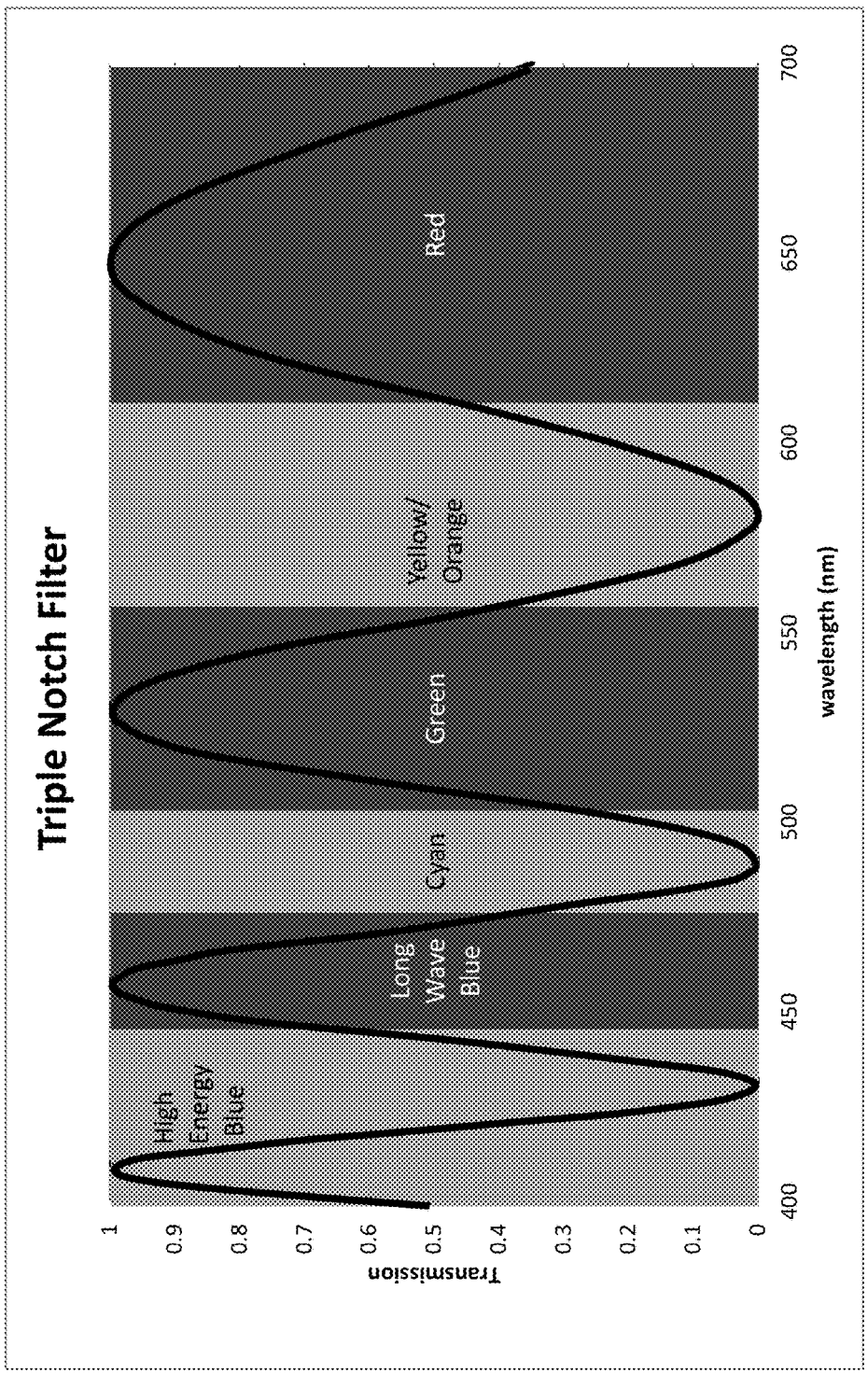
FIG. 1 is a graph of the transmission spectrum provided by an optical filter as taught herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Wavelength selective filtration can provide more sophisticated forms of image enhancement. The challenges are significant for achieving wavelength selective filtration with angle stability, low stray light, and low cost with many conventional technologies. The inventor seeks to provide a lens that satisfies the market requirements. Disclosed herein are techniques and systems related to using polarization interference filtering (PIF) to overcome the limitations of prior art eyewear lens technologies; to implement spectrally selective filtration necessary for (in particular) optimum outdoor viewing. In certain embodiments, the invention in-effect modifies the spectrum of the solar illuminant; optimizing it for the human vision system. That is, it transmits important and desirable wavelengths in correct proportions, while substantially attenuating the undesired wavelengths, as established by a large body of vision research and human factor studies. Undesired wavelengths can include the high-energy blue, spectral-cyan, and spectral-yellow portions of the spectrum, with desired wavelengths corresponding to long-wave blue, green, and red portions of the spectrum (in most cases). Benefits of a globally optimized lens include eye-safety, visual comfort/relaxation, improved mood, full-color viewing, enhanced chroma, improved visual acuity, and enhanced depth perception.

In one embodiment, a laminate containing one or more retarder films (or phase-difference films) can be used to generate two temporal output impulses from a polarized input. The interference of these two impulses at an output polarizer performs the following filtration:

Provides a transmission minimum in the high-energy blue portion of the spectrum (e.g., 400-450 nm).

Provides a transmission minimum in the spectral-cyan portion of the spectrum (e.g., 485-515 nm).

Provides a transmission minimum in the spectral-yellow portion of the spectrum (e.g., 565-590 nm).

Provides a transmission maximum in the long-blue portion of the spectrum (e.g., 455-480 nm).

Provides a transmission maximum in the green portion of the spectrum (e.g., 520-555 nm).

Provides a transmission maximum in the red portion of the spectrum (e.g., 610-680 nm).

It should be understood that the wavelength ranges listed above are approximate, and deviations of 5-10 nm from the ranges may also be acceptable.

The two-impulse PIF approach has the benefit of simplicity, in that it enables multiple pass-bands and stop-bands in the visible spectrum with a simple structure. Accordingly, these features represent single wavelength maxima/minima in each of the above bands as illustrated in FIG. 1, as opposed to prior art filtration characterized by flat regions, or multiple maxima/minima per band, which call for an increased number of impulses. In certain embodiments, the minima are fairly high in optical density, with preferred transmission values of <2% of peak transmission at center wavelengths for a filter with a high degree of color enhancement. The techniques disclosed herein rely upon the periodic nature of two-beam (two-impulse) interference, with the retardation parameter optimized to place maxima and minima optimally, in accordance with the above requirements.

Further, embodiments are shown which preserve the on-axis (normal-incidence) filtering characteristics over a broad range of incident cone angles. Such spectral stability is essential to ensuring that optimum viewing enhancement and color uniformity are maintained over the entire field of view. A benefit of the PIF approach is that structures which preserve relative amplitude and path-length difference are feasible, with the functional benefit of spectral stability off-normal. One embodiment uses four retarder layers to achieve normal-incidence performance virtually identical to a single retarder layer, but which is also preserved (to within a just noticeable difference) to an angle of 30 degrees.

Eyewear lenses are described which combine a PIF for relatively high spectral gradient (HSG), or steep transition slope filtration for enhanced chroma, with a filter of low spectral gradient (LSG) filtration (e.g. a chromatic polarizer) to create a globally optimized lens. Chroma enhancement can include increased image colorfullness and/or increased saturation. The HSG filter can pass the three additive primary colors (red, green and long-wave blue) with a quasi-neutral white point, while the LSG filter can be utilized to establish the relative level of each; as needed to give the optimum viewing experience for a particular environment and/or activity. As such, the HSG filter can be used as a building block for lenses of any white-point hue.

Practical manufacturing methods are described for creating functional sheet-stock and lens blanks which are robust and conform substantially to conventional processes and materials used in the industry. Laminates can include other functional materials, such as photo-chromics, various LSG filters to shape color balance (which may be included in the polarizer function), UV/IR filters, and auxiliary high-energy blue-blocking filters. Such sheets can be cut and fixtured into various mechanical mounts (e.g. frames) as required for flat filter product, or single-axis curved product. The laminates can be fabricated which are flat, or with single-axis curvature when in a relaxed state. The aforementioned sheet stock can also be thermoformed to produce compound-curved product (e.g. spherical or toroidal). Such lenses can also receive external functional coatings that are known in the art, including antireflection, hydro-phobic, oleo-phobic, gradient/uniform metallic reflective coatings, dielectric mirrors, etc.

The techniques taught herein relate to filters and lenses, particularly polymer plano/prescription eyewear lenses, incorporating polarization interference to provide both polarization and spectral filtering. Retarder materials are used to induce a wavelength dependent phase shift for spectral filtering that, among other functions, enhances the saturation and colorfulness of an observed scene.

Figure 2:
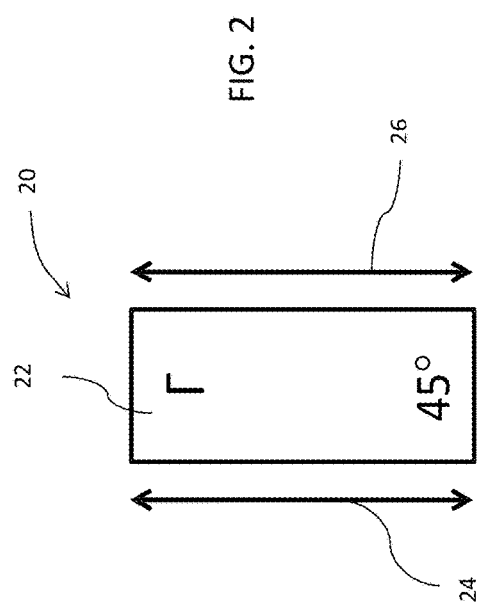
FIG. 2 is a prior art polarization interference filter (PIF) with a retarder provided between a pair of polarizers.

A two-beam PIF 20, shown in FIG. 2, includes a retarder 22 of retardance $\Gamma$ between an input polarizer 24 and an output polarizer 26. In typical PIF configurations, a uniaxial retarder is oriented at ±45 degrees between parallel (or sometimes crossed) linear polarizers. Parallel polarizer configurations form the building blocks of traditional Lyot PIFs. The transmission (T) of a single-stage filter is given by $T(\lambda)=T_0(\lambda)\cos^2[\Gamma(\lambda)/2]$, where $T_o$ is the maximum transmission value Where the phase difference, or retardation is determined by the optical path-length difference between the equal-amplitude eigen-modes, or, $\Gamma(\lambda)=2\pi[n_e(\lambda)-n_o(\lambda)]$ and $T_0(\lambda)$ is an envelope function that can account for other sources of attenuation, including (chromatic) polarizer absorption. In addition to the inverse-wavelength dependence, the retardation also depends upon the dispersion of the birefringence, which is the refractive index difference between the eigen-modes.

$\Delta n(\lambda)=n_e(\lambda)-n_o(\lambda)$, wherein $n_e$ is the index of refraction in the extraordinary axis and $n_o$ is the index of refraction in the ordinary axis Because the simple PIF represents two-beam (or two impulse) interference of equal-amplitude, the transmission function oscillates with unity amplitude and frequency determined by the "order" (number of waves of phase-difference) of the retarder, as shown in FIG. 1. Historically, filter units were cascaded to create high resolution (multi-impulse) band-pass filters using polished inorganic crystals (e.g. quartz). In recent years, organic films manufactured for the display industry have been used to create PIFs with larger aperture, thinness, and lower cost.

Most plastics exhibit birefringence as-fabricated, though films that are mass-manufactured to have engineered retardation are generally used in the display industry and are composed of either polycarbonate (PC), or polyolefin (with trade-names cyclic-olefin copolymer (COC), or cyclic-olefin polymer (COP)) resins. Other materials have also been used to make retarder films, some of which are used in the display industry as compensation films. These include polyvinyl alcohol (PVA), cellulose di-acetate, Transfan, and various liquid-crystal polymers (manufactured by e.g. Nippon Oil, Fuji, and Rolic). Some materials provide the desired optical characteristics as fabricated (e.g. cast, extruded, or coated). But more typically, a quasi-isotropic substrate is heated and stretched (usually machine-direction (MD), but also transverse direction (TD), or even diagonally), orienting molecules and producing a desired retardation value. For both PC and olefin resins, the refractive index in the stretching direction (extraordinary axis) increases, so stretching an isotropic substrate in a single direction creates a positive uniaxial material.

Polycarbonate (PC) is characterized as providing a large range of retardation values (100 nm to over 10,000 nm), has a relatively high visible birefringence dispersion, is more sensitive to mechanical loading (in terms of altering the as-fabricated retardation value and optic axis orientation), is high in refractive index (typically about 1.6), and moderately low in haze. PC is a good substrate mechanically, and environmentally stable, though it tends to swell when exposed to moisture. Products have been developed involving uniaxial stretching, biaxial in-plane stretching, and even stretching in the thickness direction. The latter is important for making single films that have a stable retardation and amplitude splitting as a function of incidence angle. PC is regularly used as a substrate in the eyewear industry, is thermo-formable, and can accept functional coatings, which are often required. Display PC films are typically fabricated in the 50-100 μm thickness range, though arbitrary thicknesses are manufacturable. Historically, manufacturers have included (e.g.) Teijin, Kaneka, Nitto Denko and Sumitomo.

COP is characterized as providing a smaller range of retardation values (typically 50 nm to 300 nm), has a relatively low visible birefringence dispersion, is insensitive to mechanical loading (in terms of altering the as-fabricated retardation value and optic axis orientation), is moderate in refractive index (typically about 1.5), and low in haze. COP films with higher retardation values (<700 nm) have also been demonstrated. Products have been developed involving uniaxial stretching, and biaxial in-plane stretching. As of the date of this disclosure, thickness-direction stretching of COP is not available, and therefore neither is the feature of providing a stable retardation and amplitude splitting as a function of incidence angle. COP is not as regularly used as a substrate in the eyewear industry, but it is thermo-formable. Progress is being made to identify processes that allow COP to accept functional coatings. Display COP films are typically fabricated in the 20-100 μm thickness range, though arbitrary thicknesses are manufacturable. Manufacturers include Zeon and JSR.

The retarder(s) may supply sufficient retardation to meet the filtration requirements described previously. This requires several waves of visible retardation; e.g., four to six waves with PC. So while a single PC film can meet the requirements at least on-axis, COP currently cannot. And even a single PC film with sufficient retardation is currently considered exotic and more difficult to source. As such, it is anticipated that products with either material are likely to require lamination of two or more films to meet the filtration requirements, even at normal incidence. Accordingly, high retardation films can be manufacturing using roll-to-roll lamination processes, in particular using solvent bonding.

The other technology required to implement a PIF is the polarizer. Like the retarder, early versions of PIFs utilized polished inorganic crystals. Today, any PIFs of significant aperture size utilize organic films. The functional layer is a polyvinyl alcohol (PVA) substrate, typically about 25 µm thick, which is stretched to orient a long-chain organic dye. Invented by the Polaroid Corporation, such films are today manufactured by companies that support the display industry. While the iodine polarizer is the workhorse of the direct-view display industry (owing to high polarizing efficiency (PE), high transmission, and neutral color), dye-stuff polarizers are attractive for the eyewear industry due to their tolerance to high temperatures. Dye polarizers can be manufactured which have fairly arbitrary transmission level and hue, with sufficient PE, as needed for eyewear lenses. Polatechno and Sanritz have manufactured PVA polarizers for the sunglass industry. There are also several manufacturers of sunglass polarizer in Taiwan and China.

Two polarizers may be used. The input polarizer polarizes the incoming radiation, substantially eliminating specular glare from a scene, while providing the polarized input necessary to implement the PIF. The second polarizer analyzes the phase difference induced by the retarder(s). These polarizers can have very different characteristics depending upon the functional requirements of the lens. Because the input polarizer is used to eliminate specular glare, it has a horizontal absorption axis and tends to provide moderately high PE throughout the visible spectrum. It may have a neutral appearance, but it may be significantly chromatic depending upon the desired hue of the lens and the color of the analyzing polarizer. The analyzing polarizer should have a moderately high PE at any wavelength for which polarization interference is used for filtration. However, it need not have a moderately high PE for wavelengths requiring sustained high transmission. Moreover, it may actually be desirable to have spectral regions of low PE as a means of spoiling the PIF function. Specifically, the PIF could provide an oscillatory spectrum over a portion of the visible band, with another portion of the visible band being free of oscillation. The latter may be needed to maintaining high transmission over a particular extended band.

In principle, the filter can be implemented using any polarizer exhibiting the necessary functional requirements, many of which are known in the prior art. This includes absorptive (e.g. dye stuff, or iodine) polarizer, or reflective polarizers. Examples of the latter include e.g. wire-grid polarizer from Moxtek or Asahi-Kasei, DBEF from 3M, and cholesteric LC polarizers from Chelix. In some instances, the polarizers are neutral, relying upon auxiliary filters to establish the lens efficiency and hue. In other cases, either one or both of the polarizers are chromatic, and have a dual purpose. In the case of compound-curved lenses, the polarizer must be durable enough to withstand the thermoforming process. For reasons of optical performance, cost, thickness, manufacturability, durability, and availability, the PVA polarizer film tends to be the most attractive.

The PIF and polarizer spectra (as well as other functional filter layers) can be used in a complementary fashion to determine the desired composite spectral response. The appearance of a lens associated with the PIF spectrum can be quasi-neutral (i.e. assuming that the polarizers are neutral). That is, a white object can be observed to have insignificant shift in hue or color-temperature if so desired. When considering only the oscillatory characteristic of the PIF, the white point can be substantially preserved by proper selection of retarder material, retardation value, and polarizer orientation. Conversely, in the event that the oscillatory characteristic of the PIF causes an undesired shift in the white point (e.g. excessive yellow filtration causing a blue shift in hue), fidelity of the white-point can be restored via LSG filtration (e.g. relatively high absorption of blue in a polarizer). Thus, we describe the combination of relative HSG filtering from the PIF, with LSG polarizer absorption, to achieve the desired overall result. If desired, the LSG filter can perform a "color balance" function on the three primary bands established by the PIF. Or alternatively, it can be used to emphasize the brightness of a particular primary color over the remaining primary colors.

The shift in the filter white point can be calculated by (e.g.) measuring the color coordinates of a standard white illuminant scattered from a Lambertian (e.g. Spectralon) target, and comparing with the color coordinates obtained with the filter inserted. A neutral filter function is one that preserves the color coordinates of substantially neutral objects. It includes the entire set of filter transmission spectra that would produce substantially identical color matches when compared to the unfiltered light with a suitable adjustment in luminance. The present invention seeks to identify a subset of filter functions that accomplishes this while increasing the colorfulness of a set of non-neutral objects.

Techniques for implementing tri-stimulus (or multi-notch) filtering are typically either of reflection or absorption based technologies. Intrinsically reflection-based filters include (e.g.) dielectric stacks, cholesteric LCs, Rugate filters, and Fabry-Perot structures. Absorption-based filters include (for example) organic dyes, photochromics, certain liquid crystals, and rare-earth doped materials. Polarization interference filters (PIFs) are typically absorption-based (i.e. the exit polarizer absorbs the rejected portion of the spectrum), though they can be implemented with reflection-based polarizers, as discussed previously. The above technologies have strengths and weaknesses when employed in eyewear filters, though it will be shown that the PIF can be particularly well matched to the present requirements.

A characteristic of any interference filter is that the spectral profile (i.e. transmission spectrum) is intimately coupled with the phase relationship between two or more interacting waves. In the case of isotropic interference filters, such as synthetic dielectric stacks, the spectral profile is changed, or is distorted when light passes through the structure off-normal. If the structure is isotropic, then this change in profile is independent of azimuth, and only depends upon incidence angle. In the case of anisotropic interference filters, the transmission function can have azimuth dependence. The details of the structure determine the nature of the spectral change. Certain isotropic interference filter designs exhibit a substantially pure blue-shift of the normal-incidence spectral profile. Other designs may show a loss in optical density (or breakup) of the desired notch spectrum, distortions of the pass-bands, or both. In any case, such phenomena manifest themselves as a perceptible angle-dependent change in the appearance of the image (i.e. brightness, hue, and chroma shifts) when used as an eyewear lens. Interference filter designs with high spectral gradients (HSG), or steep transition slopes, and high optical density can be particularly problematic, as the spectral distortions are often more severe, and thus more perceptible. Shifts which are noticeable within the field of view can be visually objectionable, and can even render a lens technology/design unacceptable.

In the case of a two-impulse (anisotropic) PIF, shown in FIG. 2, the spectral distortion is a function of both azimuth and incidence angles. These spectral distortions tend to be associated with pure shifts in the sinusoidal profile. In the 0/90 degree azimuth (plane of incidence (POI) containing the polarizer absorption axis, or orthogonal to it), such shifts are relatively insignificant. Assuming a positive-uniaxial material, a significant blue-shift occurs when the POI contains the optic axis. Conversely, a significant red-shift occurs when the POI is orthogonal to the optic axis. Again, such spectral shifts may be noticeable within the visual FOV of an eyewear lens, and therefore unacceptable.

Figure 3:
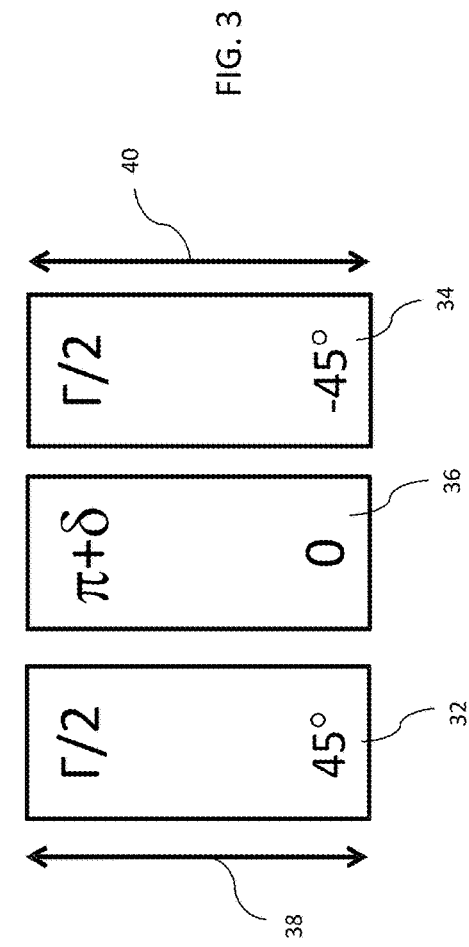
FIG. 3 is a wide-fielded PIF as taught herein.

To address these artifacts, a uniaxial retarder 30 can be "wide-fielded" using the configuration shown in FIG. 3. Specifically, the retarder is divided in half (to create a pair of retarders 32 and 34), the optic axes are crossed, and a half-wave (HW) retarder 36 is inserted there-between with optic axis parallel/perpendicular to the axes of the polarizers 38 and 40. Functionally, the half-wave retarder 36 reflects the state of polarization (SOP) about the polarizer absorption axis and switches the handedness of the SOP. This has the effect of making the retarders 32 and 34 appear to have parallel optic axes (and therefore additive retardation). However, the additional incremental retardation accumulated off-normal from the first retarder 32 is of opposite sign and substantially the same magnitude as that accumulated in the second retarder 34, again due to the action of the HW retarder 36. As such, the additional net retardation accumulated off-normal from the pair of retarders 32 and 34 is substantially nullified. This greatly stabilizes the filter spectral output with angle, such that the profile is virtually as stable in the ±45 degrees azimuth as it is in the 0/90 degrees azimuth.

While the wide-field retarder 30 includes three retardation films, the desired impulse response degenerates to that of a single retarder, or two impulses (N=2). Note that N represents the number of impulses herein, where it represents the number of retarders (giving N+1 impulses) in some of the prior art. To the extent that the HW retardation is stable with wavelength and incidence angle ($\delta$=0), the spectral profile remains stable. However, if the retardation is a function of wavelength, incidence angle, or both (the latter being most common), the spectrum becomes unstable, as would the brightness, hue and chroma of a lens. The instability can manifest itself as a shift in spectral profile, a loss in optical density of the null, and a loss in peak transmission. While the chromatic nature of the HW can cause failure of the N=2 objective, it is not a design parameter leveraged to enhance the quality of the spectral profile by increasing the number of impulses. Rather, it has an undesired impact on performance that is ideally mitigated using additional half-wave retarders to restore the N=2 objective.

The function of the three-layer wide-field structure described above can be accomplished in a single film using a biaxially stretched retarder (e.g. NRZ product developed by Nitto Denko). Specifically, when the film is stretched in the thickness direction such that the resulting refractive index is intermediate between the in-plane refractive indexes, the spectral shift off-normal is diminished. When it is near the in-plane mean, the spectral profile becomes very stable with incidence angle at any azimuth. In instances where multi-layer laminates are required to produce multi-impulse (N≥3) retarder-stack filters (RSFs) with more sophisticated spectral profiles, this is attractive in that there is no need for additional layers to wide-field the structure. It should be noted that there is a range of refractive index in the thickness direction that is achievable in manufacturing, which is coupled with the in-plane retardation. Stated differently, the condition for optimum angle insensitivity of retardation is tied to a specific range of in-plane retardation values, which can be limiting. Therefore, it can be challenging to fabricate the high retardation values desired, with optimum thickness-direction retardation. Such biaxial films have been supplied to the display industry using PC, though they are again exotic and more expensive than their uniaxial counterparts. As of the date of this disclosure, at least one major manufacturer has ceased production due to lack of volume demand.

In the absence of the biaxial retarder film described above, the number of films required to implement a wide-fielded RSF is tripled. According to a prior art example, a wide-fielded RSF with seven fundamental layers (N=8) would then require 21 layers. Moreover, it is preferred that the half-wave retarder perform the above described polarization manipulation satisfactorily throughout the spectral range. The aforementioned may be needed in order to achieve high-density minima and maintain high peak transmission throughout the visible, and to maintain that performance with incidence angle. Because the spectral range is broad for the present invention (i.e. the entire visible spectrum), a single-layer zero-order half-wave retarder may not be sufficiently achromatic. This is particularly so when using PC, due to its relatively high birefringence dispersion. However, there are single-layer achromatic retarders, such as the WB140 product from Teijin (used for e.g. OLED circular polarizers) that can potentially solve this problem. A wide-band single-layer achromatic half-wave of this type could be used in the present invention to produce a three-layer wide-fielded filter.

In the absence of a single-layer achromatic HW film, compound HW retarders of the prior art (three films per half-wave) may be required, which would require a minimum of five layers per wide-fielded retarder. In that case, an RSF with seven fundamental layers would then require 35 layers for a wide-fielded version. An eyewear filter with this many layers would be relatively expensive to manufacture, and perhaps impractically thick, and/or difficult to thermo-form.

Eyewear RSF designs of the prior art employ additional impulses (N>2) to achieve more sophisticated spectral profiles than possible with two-impulse PIF designs. However, they are relatively complex and thus more expensive to manufacture. A simple two-impulse design with carefully selected retardation characteristics can be used to attain the desired filtration operation. Additionally, a wide-fielded version of this filter with a practical number of layers can be implemented for uniform filtering with incidence angle. Again, even though these structures contain a minimum of three retarders, the filter function is in general characterized as having two-impulse interference.

In addition to the characteristics that determine the spectral and angular behavior of interference filters described previously, are those that influence stray-light. Dielectric-stack filters utilize (typically abrupt) steps in refractive index along the normal direction in order to create multiple interacting waves. The complex superposition (i.e. amplitude and phase relationship) of these waves at a particular wavelength determines the extent to which the transmitted/reflected waves are reinforced. Thus, the goal is to design a stack that reinforces the transmission of the desired wavelengths, while strongly reflecting the undesired wavelengths. For instance, filters exhibiting HSG (steep transition slopes), high density notching over extended bands, and flat-top pass-bands are routinely manufactured. Such is the case with eyewear filters used for "6-primary" spectral-based 3D cinema. However, because the rejected band is reflected, there is a much greater opportunity for said light to contribute to stray light than were it absorbed. And insofar as the rejected portion of the light can comprise a significant proportion of lumens to that transmitted, there is a potential for significant stray light that creates eyestrain and discomfort. Consider the significant impact of using an antireflection coating, which is designed to minimize only the 4% of light reflected from an uncoated surface, whereas a dielectric stack lens may be called upon to reflect well over 50% of the incident lumens.

For light directly incident on the back surface of an eyewear lens (viewer side), coated with a dielectric stack filter, the level of reflection can be very strong. Some light shielding can be provided by the temple design which mitigates this, but it limits frame style choices, and is seldom completely effective. Additionally, light transmitted through the lens is scattered from the viewer into a broad range of angles; creating an image of the viewer at roughly the relief distance (distance from eye to lens) in front of the lens. This ghost-image competes with the transmitted image to create eye fatigue and discomfort. The angle sensitivity of a reflection interference filter spectrum exacerbates the situation, since light efficiently transmitted through the lens initially may not be so when returned to the lens at a different angle. Again, decoupling filtration from reflection not only allows much reduced lens reflection, but it also allows antireflection coatings on either surface, which can further enhance the see-through of the lens. In general, the preferred lens completely extinguishes any stray light by using a low-haze, low fluorescence, absorption-based filter in combination with low external reflection (i.e. AR coatings).

The lens/filter disclosed herein can be relatively free of stray-light issues, because it is an absorption-based filter. For light directly incident on the back surface, the 4% reflection can be greatly diminished via an AR coating. Another source of stray light is that transmitted through the lens, scattered from the viewer, and reflected from both surfaces. Again, a back-surface AR coating can greatly diminish the contribution of that surface. Light reflected from the front surface must pass through the absorptive filter twice. So in addition to viewer scattering efficiency (albedo) and the 4% reflectivity of an uncoated front surface, there is a double-pass attenuation of the composite filter. As a ratio of the initial transmitted image, this level can be very weak. For example, assuming a typical 15% photopic-transmission absorptive filter, an uncoated front surface would return a small fraction of a percent of the luminance associated with the intended image. As such, an AR coating on the back (inner) surface is of much greater importance in reducing stray light than an AR coating on the front surface. Note that absorptive filters can make reflective coatings on the input face viable (i.e. from a stray-light standpoint) due again to the low double-pass efficiency of the stray light.

The perceived lightness, hue, and chroma of an object observed through a lens are dependent upon the power spectrum and angular distribution of the illuminant (e.g. the sun), the spectral reflectance (surface and volume scatter) of the object, the spectral transmission of the eyewear filter, and of course the response of the human vision system. An exhaustive analysis of this requires use of the bi-directional reflectance distribution function (BRDF) to describe the interaction of light with objects. And the perception of objects in a scene does not consider them in isolation, but requires context due to the spatial dependence of the vision system. It is a highly complex problem to analyze thoroughly. But for the present purposes, an eyewear filter can be thought of as a (relatively practical) means of modifying the solar illuminant; to make it a "better" light source for viewing the world. Safety objectives notwithstanding, there are several reasons for doing this many of which are familiar.

When the sun is too intense, a sunglass lens reduces the brightness to a comfortable level; a filtering operation that can be spectrally neutral, or flat. A filter can also effectively change the color temperature of the sun, which can shift the hue of all objects in a manner that is more comfortable and/or pleasant to the eyes. Such filtering can be accomplished via small gradients of low absorption density in the transmission spectrum. For example, a brown lens can be a quasi-linear spectral ramp, with transmission increasing throughout the visible. Color constancy can make such hue shifts acceptable/desirable to the vision system, but there are limits: High density attenuation spanning any of the prime colors (associated with the S, M and L cone receptors, and subsequent processing that determine the perception of color) is undesirable, as it greatly diminishes color rendering and appreciation of full-color in images. For instance, a "blue-blocker" lens which absorbs all light in the 400-500 nm band substantially eliminates any S-cone excitation, creating a saturated yellow appearance, and eliminating any ability to appreciate blue content in a scene. It can also affect peripheral vision, since the density of S-cones increases outside of the fovea. Conversely, the lens designs taught herein provide for regions of high-density blocking which still permit full-color perception, while making the world more pleasing, engaging, and comfortable to observe.

In addition to conventional sunglass filtration, there is mounting evidence that humans prefer a more colorful world than they observe with the naked eye. Such filter functions require more selective spectral gradients than discussed previously. Examples of preference for enhanced chroma are as follows: Photographic film that increases chroma has long been known to be a favorite among artists for landscape photography (e.g. Fuji Velvia), consumers typically increase chroma to unnatural levels when processing their digitally captured images, modern televisions (OLED and quantum-dot backlight) are frequently demonstrated with scenes containing unnaturally "punched-up" colors, and researchers designing solid-state lighting have found that consumers prefer wavelength selective sources that increase chroma. This is even the case when observing challenging imagery, such as skin tones. Recent human factor studies have verified that people often prefer images with enhanced chroma over those that better preserve color fidelity. Preference for higher chroma, and the benefits of trichromatic illumination to visual acuity, has been known for some time; Thornton observed this when designing fluorescent lighting. It therefore seems quite reasonable to expect that consumers would also prefer to view the natural world with increased colorfulness and saturation, via filters that create a more wavelength selective illuminant. In performing recent human-factors testing, researchers have also come to recognize that industry standards such as correlated color temperature (CCT) and the color rendering index (CRI) do not adequately capture viewer preference for chroma enhancement, with proposed new standards currently under consideration.

In addition, it should be pointed out that polarizers are incorporated to perform an object-dependent filtering that is complementary to spectral filtration. Functionally, a polarizer can be considered a filter that selectively attenuates the lightness of specific objects in a scene; usually those in greatest need of it for visual comfort. Eliminating glare allows more comfortable viewing of directly illuminated objects with high surface scatter, facilitating observation of the volume scatter more associated with the color of the object. This form of filtration is unique, in the sense that it depends upon the geometry of the scene (e.g. the viewer position, the position of the illuminant, and the orientation of specular objects relative to each).

Maintaining color fidelity of a scene, often associated with the CRI is in many instances at odds with the objectives of the present invention. That is, the lens often deliberately distorts the hue of objects in order to achieve the goal of enhancing the colorfulness and/or saturation. For instance, objects that appear to be pastel brown or yellow-green to the naked eye, can appear to have increased chroma with hue shifted toward the red, or green, respectively, when viewed through the filter. A consequence of this distortion when observing the natural world is that boundaries associated with objects in juxtaposition that otherwise appear quasi-homogeneous, can become more evident. For instance, a scene of dense vegetation may have a variety of species of trees and shrubs randomly positioned in space. Without the filter, the scene can appear drab; to possess little contrast and color diversity. As such, the vegetation can tend to blend together and appear flat. The filter can emphasize subtle differences in spectral reflectance (e.g. the specific color of leaves), as well as differences in structure (e.g. the specific distribution of branches and leaves within a tree). These amplified chroma-steps (and to some extent luminance-steps), can facilitate identification of boundaries of objects and groupings/clusters of structure/texture, helping the vision system better locate them in space. Thus, in addition to making the scene more interesting and compelling, the filter of the present invention also provides a better sense of depth perception.

Further to this, the lenses taught herein can enhance athletic performance and enjoyment of outdoor activities. This can result from improved visual acuity and depth perception, as well as the psychological benefits owing to the positive emotional response obtained when viewing a more stimulating image. The tendency is for scenery containing enhanced color to appear more vibrant and stimulating, increasing a sense of well-being. A chroma enhancing lens can be used by golfers to better assess the spatial location of trees (and other objects), to assess subtle differences in the characteristics of grass, to visually locate the ball, and simply to better enjoy the setting. Other outdoor sports requiring rapid detection of moving objects (e.g. a ball or competitor) on a particular background can benefit from the techniques taught herein. They can enhance visual edge-detection and improve response-time. Fishermen can use the combined polarization and spectral filtration of the present invention to better observe below-water activity. Cyclists, hikers, runners, and snorkelers/scuba-divers can all improve upon the quality of their experience by wearing eyewear using the present invention.

Commercial/Military applications can also benefit from the improvements herein by making it feasible to complete tasks involving chromatic objects/subjects faster, and with better precision. Those working in the agriculture industry can more easily detect the health of vegetation, or locate fruit/vegetables when harvesting. Pilots and military personnel can also benefit from the characteristics of the present invention for more accurately/rapidly extracting information from a scene. Any technician/professional engaged in a task involving manipulation or assessment of content that uses color vision can potentially improve upon efficiency and accuracy using the present invention.

The lenses taught herein can also be useful for improving the perception of color among the large population of humans (particularly males) afflicted with color vision deficiency (CVD). Through appropriate notching (e.g., of anti-prime colors spectral cyan and yellow), the filter can greatly influence the opponent signals that determiner color perception.

Customization of the present invention for a particular activity/environment can also be accomplished. Lens design variables include selection of retarder order, retarder birefringence dispersion, adjustments in green center wavelength, polarizer configuration (angles of input/output polarizers), polarizer type (e.g. neutral, or colored), spectral characteristics of the polarizing efficiency, and auxiliary filtration. The objective may be to better detect an object on a particular background, (e.g. such as a tennis ball on the court background color). The optimization entails identification of a lens transmission spectrum which maximizes the perceived contrast between the salient feature(s) in the image and the background, including the combined parameters of hue, chroma and lightness (brightness). The latter can be quantified using a number of standard techniques characterizing visual response, such as $L^*a^*b^*$ space, HSV, HLS, and the like as are well known in the art.

The visual impact of the filter on the spectral signature of the input is conveniently done by considering specific chromatic objects. The retina normally contains three types of color photo receptors; often termed short (S), medium (M), and long (L) wavelength cones, which are processed locally to create sum/difference signals. In order for an object to appear saturated yellow, for example, it must have a strong (M+L) signal relative to the blue (S) opponent signal. An object that efficiently scatters all but blue wavelengths can thus have both a high degree of yellowness and a high degree of lightness, owing to the large potential (M+L) signal. For instance, yellow turned leaves on a tree usually appear much lighter than surrounding green leaves, and it is this lightness that contributes substantially to the beauty of fall colors. Such broad-band (e.g., yellow) objects are much more common in the natural world than narrow-band (e.g., yellow) objects. Further, any spectral signature (i.e. illuminant spectrum multiplied by reflectance spectrum) with a relatively weak S-cone signal and a balanced red/green opponent signal represents a metamer of yellow.

Consider such a broadband saturated yellow object filtered by a lens as taught herein. The suppression of a narrow band of wavelengths centered on unique yellow (about 577 nm) can diminish perceived lightness significantly, while having little impact on hue and chroma. Accordingly, such a reduction in lightness of broadband yellow objects can affect balance relative to other objects of a different spectral reflectance that are less influenced by the notch filter. For instance, a reddish object may experience much lower attenuation by a filter than a juxtaposed yellow object, thereby affecting their relative balance of lightness. The notch can also have significant impact on the hue and chroma of the reddish object, making it shift toward a more saturated red. The relative lightness and increased chroma of the reddish object, versus the filtered yellow object can create a striking and pleasing visual quality.

For the naked eye, the red-green opponent signal is determined by the difference between overlap integrals associated with the product of L and M curves, respectively, with the spectral signature of an object. By attenuating a band between primary red and green, long-wave green (or greenish yellows), and yellow/orange wavelengths can have relatively little influence on the red/green opponent signal, and therefore the perceived hue. Equivalent to changing the illuminant spectrum discussed previously, it is as if the filter modifies the color matching functions of the eye. The range of wavelengths over which the M and L cones collect photons becomes confined substantially to primary green and primary red wavelengths. In the absence of information centered approximately on unique yellow, the ability to detect hue in this part of the spectrum relies predominantly on the relative amplitude of primary green to primary red, as defined by the band-edges of the notch filter.

The ability of the vision system to detect small shifts of a quasi-monochromatic input is heightened in the cyan and yellow portions of the spectrum. In the yellow, this is where a differential change in the red-green opponent signal has the most influence on perceived hue. For instance, a typical observer may be able to detect a 0.5 nm shift in a quasi-monochromatic yellowish source, while barely able to detect a 5 nm shift in a long-wave red source. But the vision system cannot discriminate between a single monochromatic source and (e.g.) a two-tone metameric source composed of quasi-monochromatic red and green with appropriate balance. This is simply because the red-green opponent signal can be made to be an identical match. As such, the heightened sensitivity to monochromatic color shift in the yellow extends to describing the sensitivity of the balance between the relative amplitude of a two-tone source. So by transmitting only narrow bands centered on primary green and primary red, a filter places much greater emphasis on the detailed structure of the spectral signature of objects and how specific wavelengths affect the balance between peak (r/g) wavelengths in determining the perceived hue. And because this occurs in a band where the vision system is most sensitive, large distortions in perceived hue can be introduced.

In reality, it is difficult and even undesirable for a sunglass lens to sample only a narrow band of wavelengths in the red, green and blue. Sunglasses must transmit a certain percentage of lumens according to standard specifications, which requires broadening the primary color pass-bands. Moreover, extremely narrow transmission bands can place excessive emphasis on specific wavelengths in determining the opponent color signal, and thus can cause excessive hue distortion. Accordingly, the bandpass profiles in the embodiments disclosed herein are oscillating or sinusoidal functions, and thus represent a continuous weighted sampling of the M and L curves, with PIF peaks/minima only at single wavelengths. The specific balance of the red/green amplitudes in the presence of a neutral input can be engineered by the placement of the yellow minimum wavelength with respect to the M and L curves, selecting the width of the notch (order), and introducing additional LSG filtration.

On the other hand, filters that do not substantially isolate red and green bands, due to shallow transition slopes, insufficient notch width, and low attenuation density, tend to mute the desired chroma enhancement effect. Insufficient filtering weakens the impact on colorfulness and the image lacks "pop". When considering conventional technologies for implementing plastic sunglass lenses, such as dyes, optimum spectral profiles for chroma enhancement may be difficult to implement in practice. However, the present invention permits notch transmission spectra with sufficiently steep slope, width, and density to clearly define the primary color profiles. The yellow notch defines the long-wavelength transition of the green primary color and the short-wavelength transition of the red primary color. The cyan notch defines the short-wavelength transition of the green primary color and the long-wavelength transition of the blue primary color. Chromatically, the perceived colors can be considered weighted linear combinations of these primaries.

The spectral signature of objects we observe in the natural world is given by the product of the illuminating (solar) power spectrum and the spectral reflectance of the object. The filter of the present invention attenuates portions of this signature in a manner that is typically more selective and higher in optical density than spectral features associated with prevalent objects found in the natural world. Examples with relatively low spectral gradient (LSG) include the blue of the sky, browns (e.g. distressed vegetation, dried leaves, wood, and soil), greens and yellow-greens (e.g. healthy vegetation), yellows-ambers (e.g. certain healthy vegetation, straw, certain dried leaves) and reds (e.g. certain vegetation, certain turned-leaves, clay, flagstone). This can also include synthetic objects, such as brick, house paints, colored stains, and other pigments that are commonly observed outdoors. Typically, the spectral signature shows significant representation from all visible wavelengths, along with generally LSG, both of which contribute to a moderate/low chroma value. For instance, the brown of a tree branch can be associated with a LSG quasi-linear ramp with significant contribution from blue through red wavelengths. The green of the grass can be a similar LSG ramp with a low-density dip in the orange/red due to chlorophyll absorption. The net result is a drab appearing world; one which lacks colorfulness and differentiation.

For the most part, the natural world consists heavily of brown-yellow-green hues of low chroma value. Exceptions to this with higher chroma signatures are less common, though they are an important part of the observed outdoor world; including flowers, fruit/berries, certain turned leaves, and of course high-chroma synthetics, such as street/business signs, colorful fabrics, and (e.g.) automotive paints. Such higher-chroma objects typically have HSG transitions and relatively low representation from certain portions of the visible spectrum. The present invention also affects the appearance of such objects, though in a different way.

In the event that the filters taught herein are desired to have a neutral white-point, objects that appear neutral in the natural world should remain substantially so. For objects with any significant chroma, the impact of the filter in distorting the perceived color depends upon the specific spectral signature. And objects that appear to have the same color (i.e. metamers) can be affected differently by the filter, when considering the impact of the product of the input spectral signature with the filter transmission function. Each notch of the filter can be thought of as a pair of "trim filters". A yellow notch can be considered a short-pass trim filter that largely determines primary green, and a long-pass trim filter that largely determines primary red. The product of the green trim filter with the spectral signature largely determines the perceived green hue and the level of contribution of primary green to objects in the image. The product of the red trim filter with the spectral profile largely determines the perceived red hue and the level of contribution of primary red to objects in the image. In this case, the only way to perceive yellow in a scene, is through the appropriate mixture of red and green primaries established by the notch filter.

Figure 5:
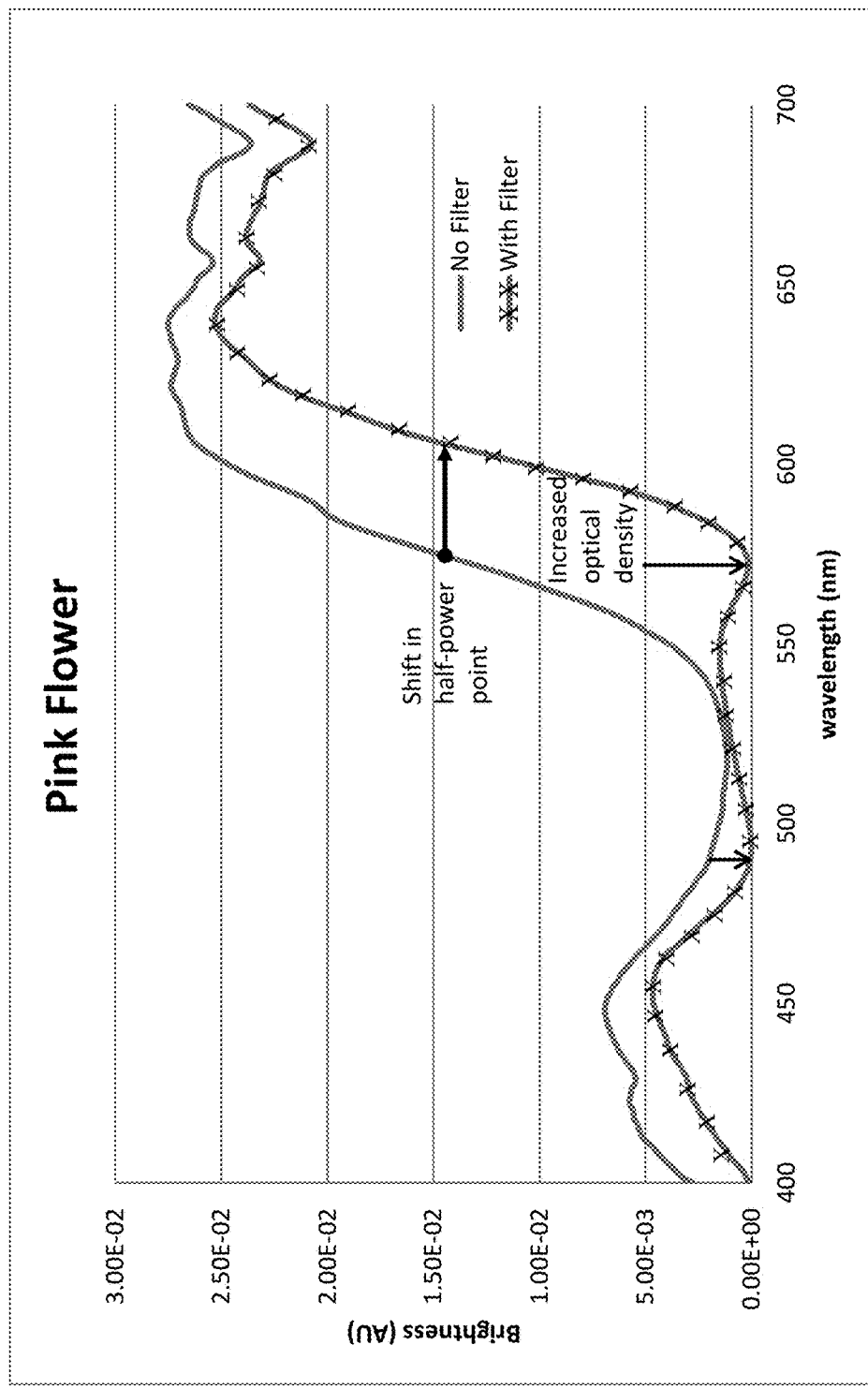
FIG. 5 includes a pair of graphs that show the spectral distribution of an image of a pink flower viewed or captured without a filter and viewed or captured with a filter as taught herein.

If for instance the input spectral signature consists of an LSG spanning the red/green, the perceived hue can be strongly influenced by the relative contribution at the filter peak wavelengths. If however, a higher chroma input signature of an object has an HSG within the notch region, the distortion can be very pronounced. Consider an object signature (e.g. a flower) with a steep positive spectral gradient that lies within the yellow notch. The object has relatively weak blue/green reflectance, with high yellow/red reflectance, appearing (e.g.) yellow-orange. In this instance, the red trim filter may substantially eliminate/erase the actual transition of the input signature; red-shifting the hue by eliminating substantially any yellow wavelength contribution from the signature. Since the signature contains a relatively weak contribution from shorter wavelengths, the elimination of yellow causes a significant red hue shift. Visually, the yellow-orange flower may appear a vibrant red color. FIG. 5 shows the measured spectra for a pink flower, both with and without a filter. The filter clearly red-shifts the transition half-power point and increases the spectral contrast using high optical density notching.

It should be noted that even objects with already high chroma value can appear to be noticeably further color enhanced when observed through the lens. Consider for example a fluorescent fabric or yellow street sign, which can have a relatively confined and highly efficient spectral reflectance signature. Such objects can appear very vibrant even in the absence of filtration. The action of the trim filtering can further enhance the appearance, giving it a monochromatic, almost self-luminant (or glowing) appearance. Though the filter clearly has a sub-unity transmission, such objects can actually appear as bright, or even brighter due to increased contrast and increased chroma.

As discussed, the filtering herein can be accomplished with virtually no change in the fidelity of the white-point. It has also been pointed out that (e.g.) filtered metamers of yellow can be transmitted with virtually no change in perceived hue or chroma. More broadly, there are a range of inputs that can be transmitted with no perceptible increase in chroma. In fact, there may be inputs for which the filter actually decreases saturation and mutes color differences. Specifically, it will be shown that the filter can stretch the range of useful color space in some instances, creating greater color coordinate separation, while compressing the separation of color coordinates in other instances. So it is clearly not in general required or even desired for the filter to enhance the chroma of all objects in order to achieve the overall goal of image chroma enhancement.

In addition to providing cyan and yellow notches for enhanced chroma, filters of the present invention can provide one or more transmission minima in the high-energy blue (HEB) portion of the spectrum (400-450 nm). These wavelengths are known to scatter more readily in the eye, cause fluorescence, are difficult to image onto the retina, and can be harmful to the health of our eyes. Recent research indicates that HEB light can also disrupt sleep patterns, exacerbated by periods of long exposure to artificial light sources from display devices. HEB light suppresses melatonin production, affecting circadian rhythms, which has been linked to certain tumoral diseases, diabetes, obesity and depression. Conversely, long-wave blue is beneficial both for improving mood and for color rendering. According to the present invention, the filter has a transmission peak in the long blue portion of the spectrum (e.g., 455-485 nm) for these reasons. PIF structures are used alone or in combination with other filters, to provide eye-safety and generate a desired visual experience. For instance, an auxiliary UV/blue-blocking filter can be combined with the HEB blocking filter, to effectively attenuate all high-energy blue/ UV light (e.g., 400-450 nm). In one embodiment, a more neutral white point can be achieved by balancing the attenuation of HEB light with the attenuation of a band centered on unique yellow, thereby substantially balancing the b/y opponent signal.

Filter Retardation Analysis

Using the simplest form of the PIF shown in FIG. 2, the design options include the amount of retardation and the polarizer configuration (parallel/crossed). Retarder and polarizer angles that maximize contrast were used in this analysis, with the understanding that other angles can have the effect of reducing optical density, decreasing peak transmission, or both. To simplify the analysis, the retarder order is arbitrarily selected for a specific green wavelength (e.g., 532 nm), with the order (or number of waves of retardation) varied at this wavelength. For the crossed polarizer cases, an additional half-wave of retardation is added to produce a peak at 532 nm. It is to be understood that adjustments in green wavelength can be made, which cause shifts in the other spectral features. The purpose here is to identify a basic range in retarder order that has the potential to meet the spectral criteria. Table 1 shows the characteristic features of each spectrum, including high-energy blue (HEB) minimum wavelength, blue peak wavelength, cyan minimum wavelength, green peak wavelength (included for completeness), yellow-orange minimum wavelength, and red peak wavelength. Entries with dark shading denote features that fail to meet the requirements for eye protection and chroma enhancement. Entries with light shading show features that are at the border-line of acceptability, and could potentially be made acceptable with a small shift in retardation. Entries with no shading are well within the acceptable criteria. Results show that a range of 4.0 to 6.0 waves of PC retardation in the green may be preferable, more precisely 5.0 to 5.5 waves in the green.

Table 1 shows that there is a range of acceptable solutions, with 5.0/5.5 waves being the best. At low order, there is not sufficient retardation dispersion to achieve peaks near the desired (blue/red) primaries and the notches encroach on the blue and spectral orange bands. In particular, the spectral gradient from orange to red is shallow, with red throughput being poor. For retarder order higher than the optimum value, the blue peak shifts long of the optimum value, and the red peak shifts short of the optimum value. A consequence of the latter is that roll-off on the long red side is significant, so red loss can become an issue. Note that photopic weighting is critical in this portion of the spectrum when assessing the brightness of red. That is, a short peak wavelength with poor long-red efficiency can appear as bright as a profile with a longer peak wavelength and broader red profile. In general, increasing retarder order decreases the width of each pass-band lobe (often characterized as the full-width-at-half-maximum (FWHM). This tends to reduce the energy contained in each of the RGB bands, which can reduce brightness, though it also decreases notch width. Narrowing the FWHM also increases the selectivity, which can in principle increase chroma, but given that the profile is sinusoidal, the center wavelengths cannot all be optimized as discussed previously.

The red roll-off that occurs when using (e.g.) 6.0 waves of retardation may be addressed by substituting a red color polarizer of the prior art, as discussed previously. Specifically, the PE spectrum of the analyzing polarizer shows a sharp transition near the peak red transmission of the PIF. That is, it behaves as a good polarizer for wavelengths short of this, and fails to polarize for longer wavelengths. As discussed previously, this can allow a relatively short red peak wavelength, with transition determined by PIF, while preserving high peak transmission for all longer wavelengths.

The optimum solutions shown in Table 1 would perform well for all angles of incidence if the proper biaxial retarder were used, as discussed previously. In the absence of this material, uniaxial solutions must be employed. Each of the designs of Table 1 has specific spectral characteristics, though the basic behavior off-normal is common to every entry. This includes excellent stability of the transmission spectrum in the plane of the polarizer (and orthogonal to it), with a large blue/red shift of the spectrum in the ±45 degree azimuth. There is however no significant loss in optical density off-normal for any azimuth angle.

Given the commonality in characteristic behavior, the following examples examine only one specific design solution in detail: 5.0 waves of green PC retardation between parallel polarizers. Specific crossed-polarizer solutions are not evaluated in detail. However, it should be noted that crossed-polarizer solutions differ somewhat from parallel polarizer configurations off-normal due to geometrical distortion. That is, parallel polarizers appear to be parallel at any azimuth, while crossed polarizers do not in general appear crossed off-normal due to geometrical rotations. This rotation is most extreme in the ±45 degree azimuth. In general, geometrical rotation of the optic axis of the retarder occurs relative to the polarizer absorption axis, though the effect is not extreme.

Example 1 Single Layer Uniaxial PC Retarder with Parallel Polarizers

This example is the simplest structure, using a single-layer uniaxial PC film between parallel polarizers. It serves as a baseline for the performance attainable without taking further measures. Table 2 shows output characteristics at normal incidence, and at 30 degrees off-normal for specific key azimuth angles. The L value is the impact of the filter transmission function on photopic brightness, assuming unpolarized light and ideal unity transmission polarizers (i.e. sinusoidal contribution only). As such, the L value with zero retardation is 50%, oscillates at low order, and converges to 25% at very high order.

The $\Delta L$ value is the brightness change off-normal as a percentage of the normal-incidence value. The color coordinates of the white-point are in x-y space. The shift of the white-point off-normal is given by the usual root-mean-square difference calculation, relative to the normal incidence white-point coordinate.

The indicator of spectral shift off-normal is taken to be the yellow minimum wavelength value, with the actual shift ($\Delta\lambda$) being that relative to the normal incidence value. The cyan and yellow transmission values are all zero in this case since the optical density is preserved. They are included as place markers for direct comparison to later wide-fielded examples that do not necessarily preserve optical density.

TABLE 1

Single PC retarder PIF solutions versus retarder order at 532 nm.

| Retardation @532 nm (waves) | Polarizer Orientation | HEB Minimum | Long Blue Peak | Cyan Minimum | Green Peak | Yellow/Orange Minimum | Red Peak | Comment |
|---|---|---|---|---|---|---|---|---|
| 3.0 | P | 402.6 | 432.9 | 475.0 | 532.0 | 615.2 | >700 | Fail |
| 3.5 | C | 413.9 | 444.2 | 482.2 | 532.0 | 601.4 | >700 | Fail |
| 4.0 | P | 424.7 | 452.4 | 487.8 | 532.0 | 591.6 | 672.3 | Fair |
| 4.5 | C | 432.9 | 459.6 | 492.0 | 532.0 | 583.9 | 651.7 | Good |
| 5.0 | P | 402.1/440.1 | 465.8 | 496.1 | 532.0 | 578.3 | 636.3 | Excellent |
| 5.5 | C | 409.3/446.2 | 470.4 | 498.1 | 532.0 | 573.6 | 624.5 | Excellent |
| 6.0 | P | 415.9/451.9 | 475.0 | 501.7 | 532.0 | 570.0 | 615.2 | Good |
| 6.5 | C | 422.1/457.5 | 478.6 | 503.3 | 532.0 | 566.4 | 607.5 | Fail |
| 7.0 | P | 402.1/423.3/462.7 | 482.2 | 505.3 | 532.0 | 563.9 | 601.9 | Fail |

The >25 nm shift (both blue and red) at 30 degree incidence produces more than a 20% loss in luminance. But more importantly, it causes very large color shifts. Given that a just-noticeable-difference (JND) in color change is about 0.01, the table shows that shifts of more than 10 JNDs occur relative to center. The maximum change in color between any two points within the FOV is $\Delta xy=0.167$.

TABLE 2

Off-normal response of 5.0 wave parallel polarizer uniaxial PC solution.

| Incidence Angle | Azimuth | L (%) | $\Delta L$ (%) | Color Xy | $\Delta xy$ | Yellow Min | $\Delta\lambda$ (yellow) | Cyan Trans (%) | Yellow Trans (%) |
|---|---|---|---|---|---|---|---|---|---|
| 0 | — | 32.5 | — | 0.378, 0.417 | — | 578.3 | — | 0 | 0 |
| 30° | 0° | 32.6 | 0 | 0.376, 0.419 | 0.0028 | 578.8 | +0.5 | 0 | 0 |
| 30° | 45° | 22.7 | −30.0% | 0.424, 0.294 | 0.1313 | 552.6 | −25.7 | 0 | 0 |
| 30° | 90° | 32.6 | 0 | 0.376, 0.419 | 0.0028 | 578.8 | +0.5 | 0 | 0 |
| 30° | −45° | 25.2 | −22.5% | 0.282, 0.381 | 0.1025 | 605.0 | +26.7 | 0 | 0 |

Example 2 Wide-Field Filter Using Single Zero-Order HW

The simplest wide-field form of the techniques taught herein is a zero-order HW retarder, parallel/perpendicular to the polarizer absorption axis, between the split multi-order retarders. This configuration is shown in FIG. 3. This example uses split-retarders, each with a retardation of 2.5 waves at 532 nm. A zero-order HW retarder with a center wavelength of 535 nm is used to balance the optical density of cyan and yellow minima at normal-incidence. The polarizers are parallel.

Were the HW retarder completely achromatic, the normal incidence performance would match closely to that of Table 1. The impact of HW retarder dispersion includes loss in optical density of nulls, loss of peak transmission, and incremental spectral shifts, all of which contribute to changes in chromaticity. So there is a sacrifice needed even in normal-incidence spectral performance in order to gain uniformity with incidence angle. The table tracks null center wavelength and density, but not peak transmission.

The first-order improvement associated with wide-fielding is borne out in much reduced spectral shift in the ±45 degree azimuth, as shown in Table 3. This is at the expense of incremental loss in peak transmission and optical density, including the normal-incidence case. Moreover, this instability is a function of azimuth off-normal as there is an associated shift in the half-wave retardance center wavelength, which is greatest in the 0/90 degree azimuth. The rising/falling of optical density in the cyan/yellow notch with azimuth is clearly evident in Table 3. While not captured in this table, such fluctuations in density can impact the effectiveness of chroma enhancement. Perhaps most importantly however, the spectral shift is much reduced, as is the shift in white point for all azimuth angles. Relative to the uniaxial case, the color coordinate shift from normal-incidence is a maximum of Δxy=0.031, or about 3 JNDs. This improves upon the previous example by a factor of 4.2×. The maximum difference between any two points in the FOV is Δxy=0.047, which is reduced by a factor of 3.5×.

The parallel polarizer (normal-incidence) behavior should also be compared to designs using crossed-polarizers, as the impact of the chromatic HW is different. With parallel polarizers, the incremental change in HW retardation (with departure from the ideal half-wave wavelength) causes a loss in the optical density of minima, while ideal peak transmission is maintained. The crossed-polarizer version inverts the spectrum, thus ensuring high density nulls, but with loss in peak transmission with departure from the half-wave wavelength. Preference for high notch density or high peak transmission throughout the visible may thus dictate the preferred configuration. While these statements are in general true for normal incidence, both configurations show dependence of peak transmission and optical density off-normal. While the chromatic nature of a zero-order HW retarder compromises the performance, it does have the benefit of simplicity and does a good job of suppressing the spectral shift. So if the spectral performance over the field of view is considered acceptable, this can be a viable solution.

Example 3 Wide-Field Filter Using Two-Layer Rotator

Figure 4:
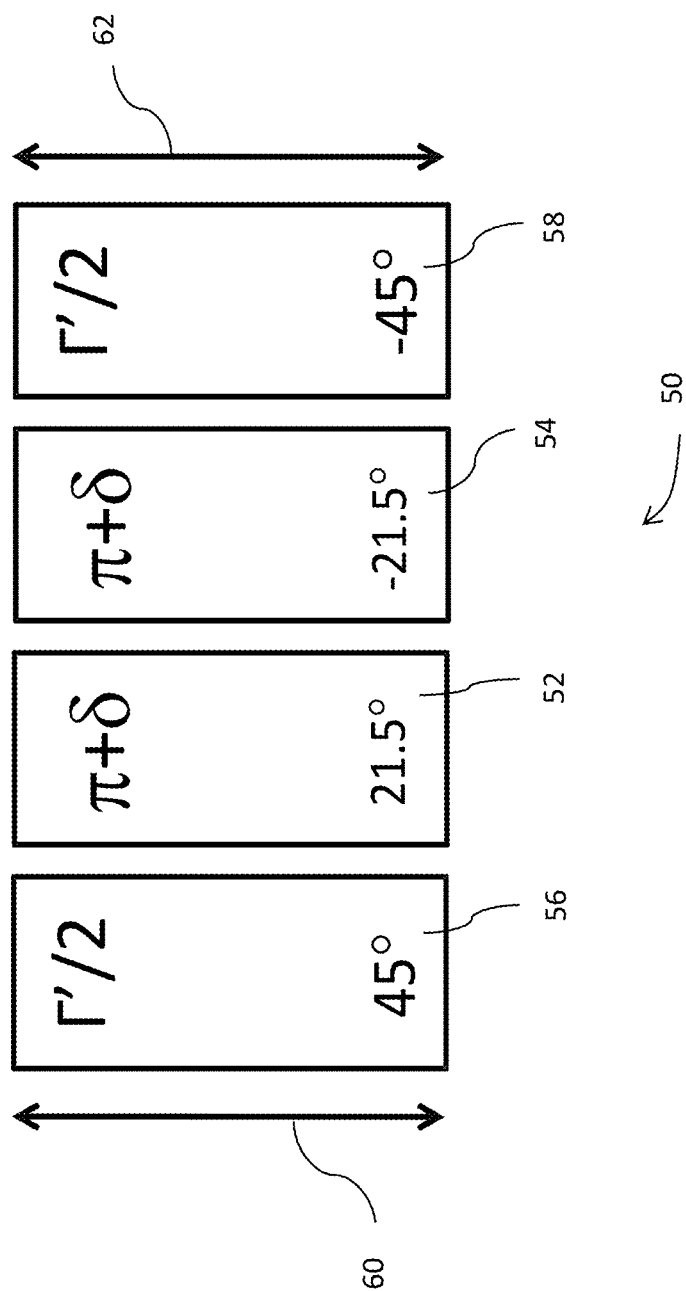
FIG. 4 is a wide-fielded PIF with rotator as taught herein.

Another design, shown in FIG. 4, uses a two-layer rotator as a means of wide-fielding the filter 50. The benefit of increasing the number of HW retarders is that the central polarization transformation can be made less chromatic over the visible. In this case, two zero-order HW films 52 and 54 are arranged between the split retarder (56 and 58), which in turn is between polarizers 60 and 62, as shown in FIG. 4. The two HW retarders have the appearance of effectively rotating the polarizer by 90 degrees, so peaks and minima are swapped. This inversion can be counteracted by adding/subtracting a quarter-wave of retardation to each of the split retarders (denoted by a prime in the figure). To the extent that the rotator is achromatic over the visible, it appears the same as the crossed-polarizer case. However, the transformation is not completely achromatic so the parallel polarizer case with a quarter-wave of shift added to each outer element (e.g. 2.25 waves), does not completely match the crossed polarizer case with no retardation shift (with e.g. 2.5 waves of retardation). The example of Table 4 corresponds to that of FIG. 4, with the split retarders having a retardation of 2.25 waves at 532 nm. As shown, the HW retarders are symmetrically placed with respect to the polarizer, with a center wavelength of 516 nm. There is a subtle change in the chromatic behavior of the rotator as the HW angles are rotated symmetrically with respect to the nominal ±22.5°. A change in the magnitude of the angle causes a shift in the pair of wavelengths at which the transformation (which can be demonstrated on the Poincare sphere) is complete. A reduction in angle shifts the wavelengths apart (giving broader wavelength coverage, but with some sacrifice of the mid-band performance), while increasing the angle further narrows the spectral coverage. Given the broad range required to cover the visible, some reduction is generally desirable (e.g. the ±21.5° example given), while a further increase tends to be less so. It has been determined via experimentation and simulations that reasonable results can be achieved at least in the range of HW angles as low as ±19° up to HW angles as high as ±24°.

The addition of a second half-wave retarder enables further improvement in both normal and off-normal characteristics. In this rotator case, the change in luminance with angle remains very small, but more importantly, the white-point shift is at or below a JND. The optical density is in general high, with transmission remaining below 2%. The only notable loss in performance relative to the previous example, is a 3 nm shift in the yellow null at one azimuth. Thus, the two-layer example has the benefit of providing near ideal performance, with the addition of a single layer.

TABLE 3

Off-normal response of 5-wave parallel polarizer uniaxial PC solution, with single zero-order HW wide-fielding.

| Incidence Angle | Azimuth | L (%) | ΔL (%) | Color Xy | Δxy | Yellow Min | Δλ (yellow) | Cyan Trans (%) | Yellow Trans (%) |
|---|---|---|---|---|---|---|---|---|---|
| 0 | — | 33.0 | — | 0.367, 0.393 | — | 577.7 | — | 2.9 | 2.2 |

TABLE 3-continued

Off-normal response of 5-wave parallel polarizer uniaxial PC solution, with single zero-order HW wide-fielding.

| Incidence Angle | Azimuth | L (%) | ΔL (%) | Color Xy | Δxy | Yellow Min | Δλ (yellow) | Cyan Trans (%) | Yellow Trans (%) |
|---|---|---|---|---|---|---|---|---|---|
| 30° | 0° | 33.9 | 2.7 | 0.375, 0.410 | 0.0187 | 578.3 | +0.6 | 1.9 | 7.9 |
| 30° | 45° | 32.0 | 3.0 | 0.369, 0.423 | 0.0300 | 578.8 | +1.1 | 2.2 | 0.5 |
| 30° | 90° | 32.9 | 0 | 0.354, 0.379 | 0.0191 | 578.8 | +1.1 | 4.6 | 0.1 |
| 30° | −45° | 32.0 | 3.0 | 0.369, 0.424 | 0.0311 | 578.8 | +1.1 | 2.2 | 0.5 |

TABLE 4

Off-normal response of 5.25-wave parallel polarizer uniaxial PC solution, with two-layer rotator wide-fielding.

| Incidence Angle | Azimuth | L (%) | ΔL (%) | Color xy | Δxy | Yellow Min | Δλ (yellow) | Cyan Trans (%) | Yellow Trans (%) |
|---|---|---|---|---|---|---|---|---|---|
| 0 | — | 32.5 | — | 0.396, 0.405 | — | 573.6 | — | 0.6 | 0.2 |
| 30° | 0° | 32.0 | 2.7 | 0.400, 0.399 | 0.0072 | 572.1 | −1.5 | 1.3 | 0.6 |
| 30° | 45° | 32.5 | 3.0 | 0.392, 0.409 | 0.0057 | 574.1 | +0.5 | 1.3 | 0.9 |
| 30° | 90° | 32.9 | 0 | 0.386, 0.413 | 0.0128 | 576.7 | +3.1 | 0.2 | 1.6 |
| 30° | −45° | 33.6 | 3.0 | 0.392, 0.409 | 0.0057 | 574.7 | +1.1 | 1.3 | 0.8 |

Example 4 Wide-Field Filter Using Three-Layer Compound HW Retarder

This example uses the same arrangement of Example 2, but with the zero-order HW retarder replaced by a three-layer compound HW retarder. The HW retarders have a center wavelength of 516 nm. The outer HW layers both have an orientation of 30 degrees, with the central HW retarder having an orientation of −30 degrees. As before, the split retarders each have a retardation of 2.5 waves at 532 nm.

As Table 5 shows, the addition of a third HW retarder further refines both the normal incidence and off-normal incidence performance. Shifts in brightness are insignificant and the shift in white-point is well below a JND. The improvement over the two-layer solution is incremental, and as such, the question is whether it is significant enough to justify the additional layer.

TABLE 5

Off-normal response of 5-wave parallel polarizer uniaxial PC solution, with three-layer compound HW wide-fielding.

| Incidence Angle | Azimuth | L (%) | ΔL (%) | Color xy | Δxy | Yellow Min | Δλ (yellow) | Cyan Trans (%) | Yellow Trans (%) |
|---|---|---|---|---|---|---|---|---|---|
| 0 | — | 32.4 | — | 0.378, 0.417 | — | 578.3 | — | 0.2 | 0.1 |
| 30° | 0° | 31.7 | −0.7 | 0.374, 0.421 | 0.0056 | 578.8 | +0.5 | 0.4 | 1.3 |
| 30° | 45° | 32.3 | −0.1 | 0.374, 0.419 | 0.0044 | 578.9 | +0.6 | 0.6 | 0.7 |
| 30° | 90° | 32.1 | −0.3 | 0.377, 0.416 | 0.0014 | 578.8 | +0.5 | 0.9 | 0.7 |
| 30° | −45° | 32.3 | −0.1 | 0.378, 0.416 | 0.0010 | 578.8 | +0.5 | 1.1 | 2.1 |

Specifically, it is important to consider whether this improvement would actually be realized in a manufacturing environment. This is because all modeling results provided in the tables are based on prescribed optic axis orientation and retardation, with no account being made for practical issues associated with the as-fabricated material statistics, as well as any changes resulting from fabrication, such as lamination stress, and thermoforming stress. It should be pointed out that Monte Carlo simulations can at times predict lower performance in practice when using a greater number of retarder layers with statistical uncertainty in optic axis and retardation, even though the ideal case indicates better performance.

The above analysis can be repeated for retarder materials with different optical characteristics, such as COP, which has very low birefringence dispersion. A benefit of higher birefringence dispersion is that the desired filter profile can potentially be achieved with lower retarder order. Alternatively, materials with even higher birefringence dispersion than PC could potentially further decrease the optimum retarder order. Molecules with controlled birefringence dispersion, such as the wide-band retarder product (e.g. WB140) developed by Teijin, demonstrate that birefringence dispersion can also be engineered at the molecular level. Table 6 is the zero birefringence dispersion counterpart to Table 1, which shows that the optimum range of green retarder order increases to 6-8 waves, potentially 6.5-7.5 waves. With lower dispersion and higher order, the long-wave red roll-off is more of an issue unless it is desirable to suppress longer wavelengths. Or, as discussed previously, an analyzer with poor PE in the red is used.

in order to obtain the correct relative emphasis between (e.g.) the redness of objects in a scene and the greenness of objects in a scene.

The filter seeks to enhance chroma by exploiting an expanded area of color space, both through increased saturation and, increased image colorfulness. The latter refers to distorting the hue of certain objects in a manner that accesses regions of color space not normally observed in a (e.g. outdoor) scene. A particularly dramatic demonstration of this is the shift of the hue of brownish/reddish objects toward deeper and more saturated reds. This can change the color space statistical distribution, such that areas of color space not normally "populated" in any significant way, are highly represented.

Figure 6A:
FIGS. 6a and 6b show the relative shifting of a portion of the wavelength spectrum passed through a long pass filter and without the color enhancement filter taught herein (FIG. 6a) versus with the color enhancement filter taught herein (FIG. 6b).
Figure 6B:
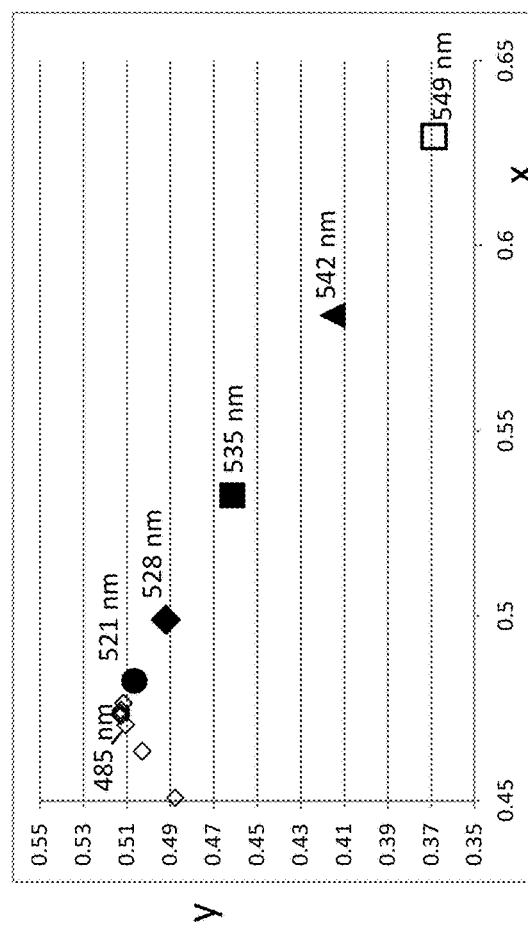

The scan of a long-pass filter, though a simplistic representation of an object reflectance spectrum, illustrates this point. The reflectance spectrum in this case represents a weak signal for short wavelengths, with a fairly steep transition to a relatively high spectral reflectance at longer wavelengths. In this example, the reflectance at short wavelengths is insignificant (about 0.1%), and the reflectance at long wavelengths is unity. The transition bandwidth (10%-90%) averages a fairly steep 3.3% of the half-power point (HPP) wavelength. The CIE 1931 color space 2-degree color coordinates (from the CIE color space or chromaticity diagram created by the International Commission on Illumination (CIE) in 1931) are tracked both with and without the filter as the HPP of the reflectance spectrum is scanned. Each unique HPP, and associated color coordinate, can be considered to represent an object present in a scene. The results for the long-pass profile are shown in FIGS. 6a and 6b.

TABLE 6

PIF solutions with zero birefringence dispersion retarder.

| Retardation @532 nm (waves) | Polarizer Orientation | HEB Minimum | Long Blue Peak | Cyan Minimum | Green Peak | Yellow/Orange Minimum | Red Peak | Comment |
|---|---|---|---|---|---|---|---|---|
| 5.0 | P | 409.8 | 443.7 | 484.3 | 532.0 | 591.6 | 665.1 | Fail |
| 5.5 | C | 418.5 | 450.9 | 487.8 | 532.0 | 585.5 | 650.2 | Fail |
| 6.0 | P | 426.2 | 456.0 | 491.4 | 532.0 | 580.3 | 638.4 | Good |
| 6.5 | C | 431.9 | 461.6 | 494.0 | 532.0 | 576.7 | 629.1 | Excellent, note 691.8 minimum |
| 7.0 | P | 438.5 | 465.8 | 496.6 | 532.0 | 573.1 | 620.4 | Excellent, note 676.9 minimum |
| 7.5 | C | 444.2 | 469.9 | 498.6 | 532.0 | 570.6 | 614.2 | Good, note 665.6 minimum |
| 8.0 | P | 406.2/448.3 | 473.0 | 501.2 | 532.0 | 568.0 | 608.6 | Fair, note 654.8 minimum |
| 8.5 | C | 410.8/452.4 | 476.0 | 502.7 | 532.0 | 565.4 | 602.9 | Fail, note 646.1 minimum |

Examples of Simple Inputs

Based on the above, the HSG notches can cause significant increase in chroma value of natural objects. The product of a low-chroma green object (e.g. grass), with the green pass-band profile of the lens, can give a rich more colorful green. This is accomplished by allowing only those wavelengths associated with primary green (of a desired hue) to pass. The fundamental limitation however is that low chroma objects also tend to have broad spectral signatures spanning more than one prime color, and therefore significant contribution from all three cone receptors. So beyond HEB/cyan/yellow notch filtering, little can be done to emphasize a particular hue without affecting the hue of all objects in a scene. A deliberate shift in the balance that affects the lens hue may however be beneficial or desirable As the HPP of the reflectance spectrum is red-shifted, the color initially shifts from the white-point (i.e. the complete absence of filtering), to a saturated yellow with diminishing of the S-cone signal (i.e. elimination of blue light). As the HPP is scanned to still longer wavelengths, the color coordinate substantially follows the locus of the CIE diagram as the M-cone signal is weakened relative to the L-cone signal, noting that there is virtually no contribution from the S-cone signal throughout this range. The presence of a uniform spectral reflectance (including a strong unique-yellow signal) moderates the color coordinate shift. FIG. 6a shows the shift in color coordinate as a function of HPP wavelength in the absence of the filter, with some specific color coordinates marked for comparison to the filtered case. As the HPP shifts from short-green (521 nm) to long green (549 nm), the color coordinate shifts by $\Delta xy=0.092$. This corresponds to an approximate perceived monochromatic color shift from 576 nm to 588 nm, or $\Delta\lambda=12$ nm.

Figure 7:
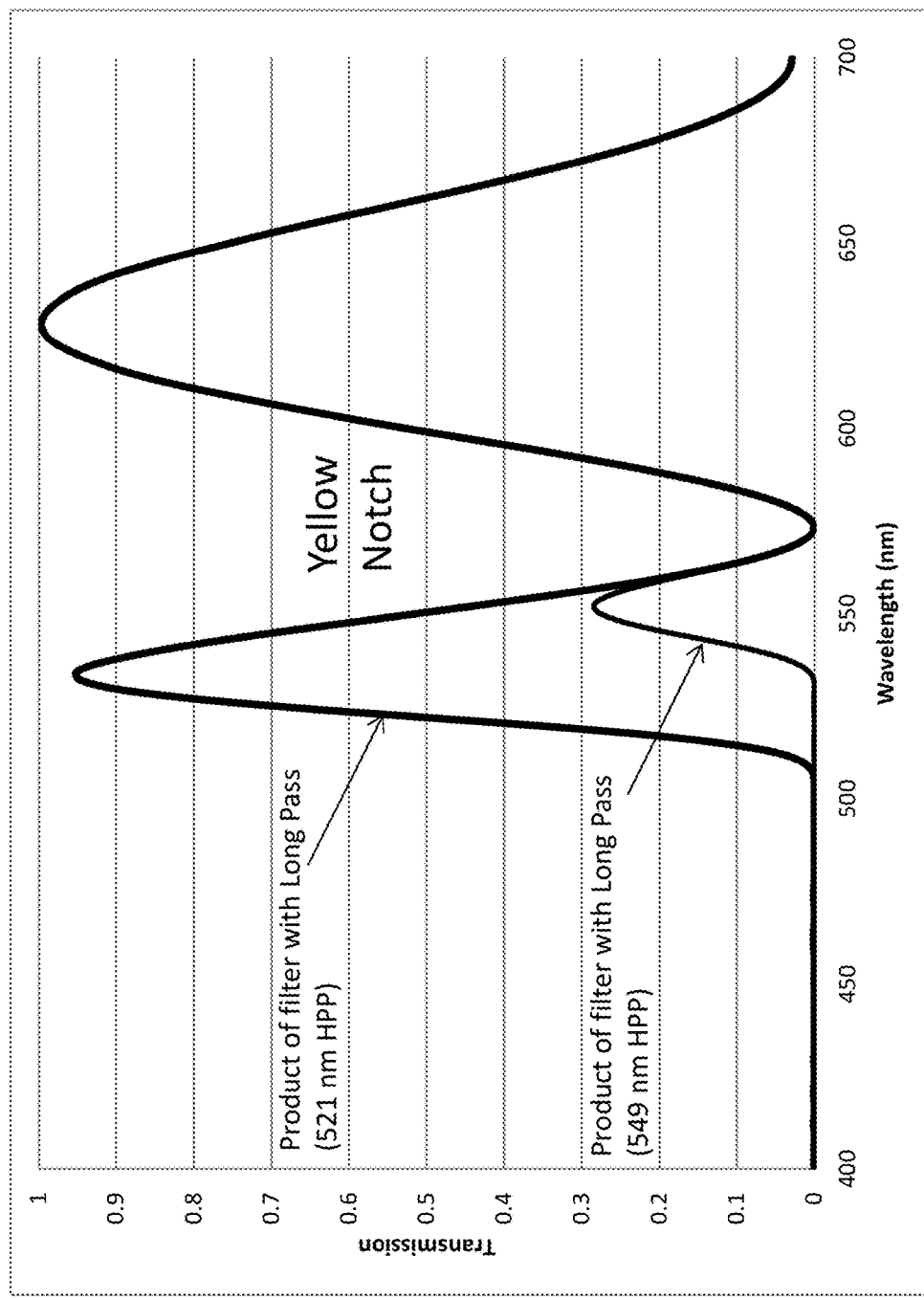
FIG. 7 shows a pair of graphs that illustrate the product of the color enhancement filter taught herein with each of two different long pass filters, one with a half-power point in the short green and one with a half-power point in the long green.

FIG. 6b shows the same scan in HPP wavelength, but with the filter present. In this case, the filter corresponds to the 5-wave green PC retarder between parallel polarizers discussed in previous examples. As before, the color shifts from the white point to a saturated yellow but the distribution of points is different. Because the cyan notch de-emphasizes the HPP in this region, a saturated yellow is achieved at a shorter HPP, while several subsequent color coordinates are compressed and are nearly overlapping. Note that the yellow color coordinate is very nearly the same as that for the unfiltered case, though it is perceived only through the relative mix of green and red light. But as the HPP begins to encroach on the short-green, the M-cone signal is rapidly diminished, as shown in FIG. 7. The absence of light at green wavelengths causes a rapid change in the r/g opponent signal, with an associated hue distortion. As the HPP shifts from short-green (521 nm) to long green (549 nm), the color coordinate shifts by $\Delta xy=0.134$. This corresponds to an approximate perceived monochromatic color shift from 577 nm to 604 nm, or $\Delta\lambda=27$ nm. In terms of comparison, the ratio of color coordinate shift is $0.134/0.092=1.45\times$. Moreover, the gain in perceived monochromatic color shift is $27/12=2.25\times$.

Figure 8A:
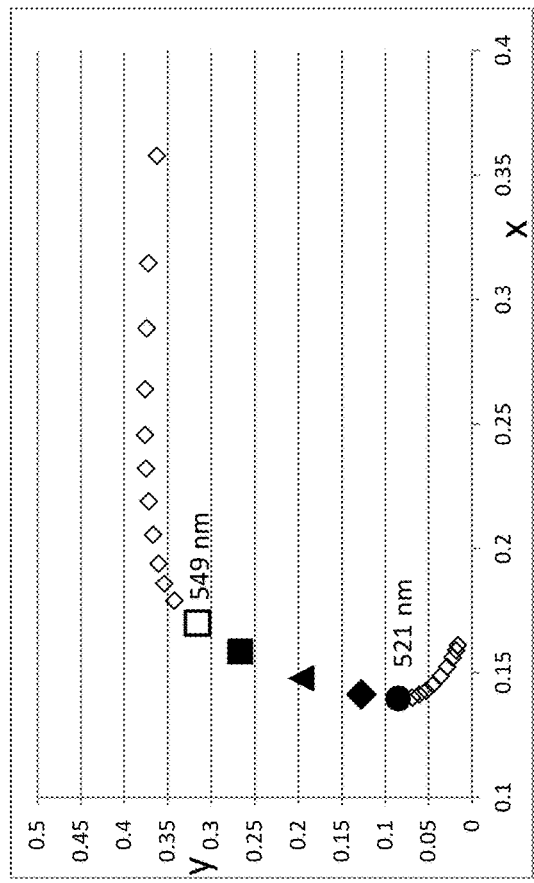
FIGS. 8a and 8b show the relative shifting of a portion of the wavelength spectrum passed through a short pass filter and without the color enhancement filter taught herein (FIG. 8a) versus with the color enhancement filter taught herein (FIG. 8b).

A similar result is obtained when blue-shifting a short-pass profile (inverse of previous example) that represents the object reflectance spectrum. As the HPP of the reflectance spectrum is blue-shifted, the color initially shifts from the white-point (i.e. the complete absence of filtering), toward the cyan with relative diminishing of the L-cone signal. As the HPP encroaches on the green, the M-cone signal is weakened, and the perceived color shifts toward the blue. FIG. 8a shows the shift in color coordinate as a function of HPP wavelength in the absence of the filter, with some specific color coordinates marked for comparison to the filtered case. As the HPP shifts from long-green (549 nm) to short green (521 nm), the color coordinate shifts by $\Delta xy=0.233$.

Figure 8B:
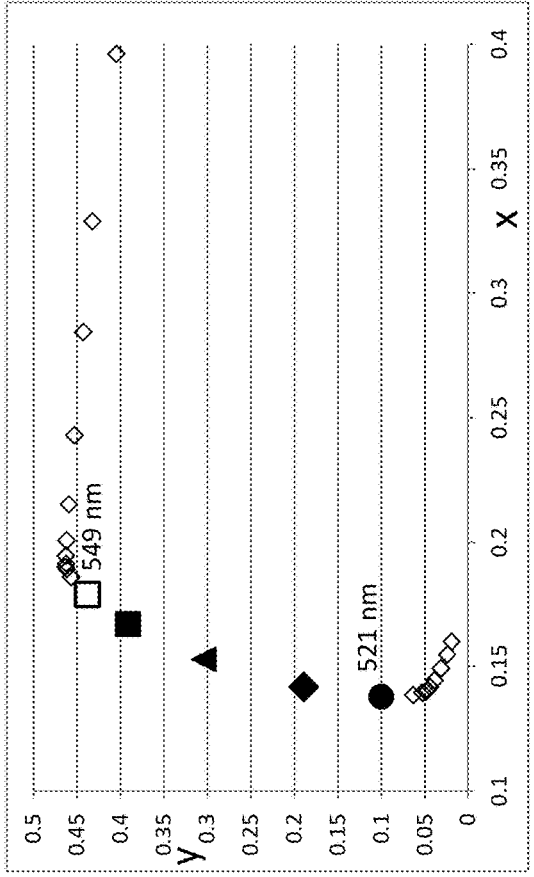

FIG. 8b shows the same scan in HPP wavelength, but with the filter present. In this case, the filter corresponds to the 5-wave green PC retarder between parallel polarizers discussed in previous examples. The color shifts from the white point toward the cyan, but the separation of points is initially much larger than the unfiltered case (note that the white point is different). The lack of yellow light causes a rapid shift in the r/g opponent signal when red is attenuated. Because of the notch filtering, the final cyan point is also more saturated than the unfiltered case. With further blue-shifting, the notch filtering causes compression of several subsequent color coordinates, which are nearly overlapping. As the HPP shifts from long-green (549 nm) to short-green (521 nm), the color coordinate shifts by $\Delta xy=0.340$. In terms of comparison, the ratio of color coordinate shift is $0.34/0.233=1.46\times$ the unfiltered case.

Figure 9A:
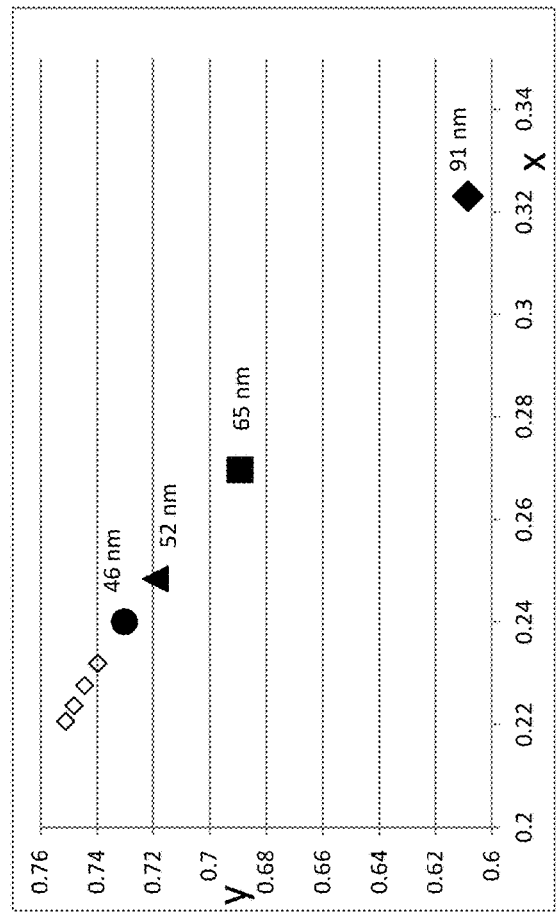
FIGS. 9a and 9b show the distribution of color coordinates at different spectral widths of a bandpass filter as the wavelength spectrum is passed therethrough and without the color enhancement filter taught herein (FIG. 9a) versus with the color enhancement filter taught herein (FIG. 9b).
Figure 9B:
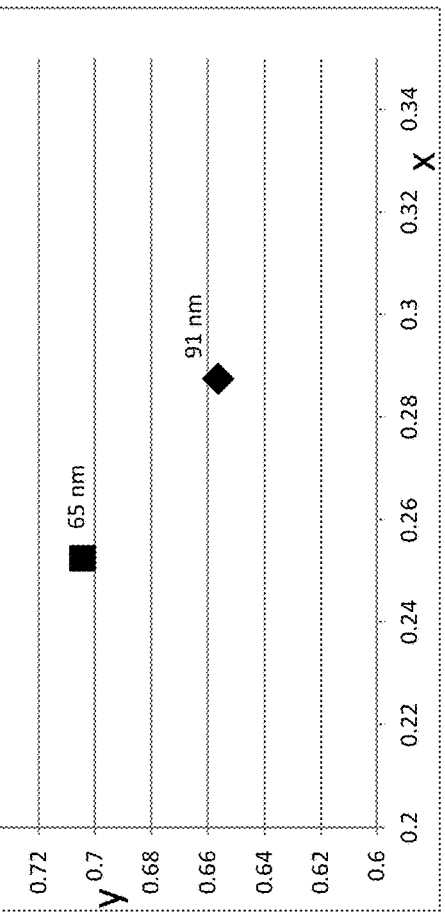

As observed above, the notch filtering can produce both increased colorfulness and increased saturation. A simple way to illustrate increased saturation is to consider objects with band-pass reflectance spectral profiles with fixed center wavelength and varying spectral width (FWHM). Taking a band-pass (transmission lobe with sine-squared profile) to represent an object, the product of the profile with the notch filter spectrum (in this case 5-waves 532 nm retardation between parallel polarizers), gives a modified profile and associated color coordinate. FIG. 9a shows the distribution of color coordinates (CIE 1931) for the naked-eye perceived colors, and FIG. 9b shows the distribution of color coordinates observed through the filter. In the absence of filtering, the broad profile produces a de-saturated greenish hue, which rapidly increases in saturation as the FWHM is narrowed. Below a FWHM of about 50 nm, the increased saturation becomes more incremental.

As for the filtered case, when the profile is wide the product gives a high transmission green lobe, with significant side lobes in the blue/red. Nevertheless, this results in a much more saturated green when observing broadband (91 nm FWHM) greenish objects versus the unfiltered case. When the profile is further narrowed, the side lobe amplitude is greatly diminished, so the initial color step associated with the 65 nm FWHM is large (though smaller than the unfiltered initial step). When the FWHM is decreased to 52 nm, the side lobes are eliminated and the saturation is dictated by the green lobe of the notch filter. This step is larger than that of the unfiltered case. By this third step, any subsequent decrease in FWHM of the reflectance spectrum has relatively little impact on color, due to the compression of color coordinates found previously. Conversely, an object must have a reflectance spectral width of approximately 35 nm (6th point on FIG. 8a) to achieve the same level of saturation as the filtered case with a FWHM of 52 nm.

The purpose of optimized filtration is to selectively reduce colors that are considered unimportant, or even reduce visual performance, while more efficiently transmitting colors that are important for vision. An approach to this optimization is to maximize $\Delta E$ for a set of input spectral power distributions (SPDs). A color difference between two objects can be calculated using formulas such as $$\Delta E^*=\sqrt{(L^*_2-L^*_1)^2+(a^*_2-a^*_1)^2+(b^*_2-b^*_1)^2}$$

which is influenced by the difference in lightness ($L^*_2-L^*_1$) and opponent color signals (($a^*_2-a^*_1$) and ($b^*_2-b^*_1$)) between any two objects (represented by the subscripts 1 and 2). For example, a color difference between a tennis ball and the court in bright sunlight can be determined in the absence of filtering using the above equation. With a filter inserted, the calculation can be repeated. If $\Delta E$ increases, then the filter can be considered to enhance the contrast. Note that a normalization is required to account for the difference in lightness between the filtered and unfiltered light levels when comparing color differences. Alternatively, color differences can be calculated using only color coordinate shifts, or hue/chroma shifts.

The outcome of such calculations depends upon lighting conditions (level, spectral luminance and angular distributions), the BRDF of the set of salient objects selected, and the characteristics of the viewer's vision system. For example, a down-hill skier with normal color vision may well prefer a filter that is quite different than that preferred by a golfer. And a filter that is desirable to an individual with color vision deficiency may be objectionable to one with normal color vision.

Consider a filter that does not attempt to improve the M/L opponent signal (perhaps even suppressing it), but concentrates specifically on the S/(M+L) opponent signal. This may be beneficial in certain scene contexts for a normal trichromat, and can also be preferred for a dichromat, or anomalous trichromat more generally.

Example: Maximize Image Quality for a Protanope

Assumptions:

The L cone is completely missing in both eyes, and there is no trichromatic vision in the fovea or at larger angles.

The subject confuses colors of equal brightness along the green-red portion of the CIE diagram locus.

The subject cannot discriminate between any color of equal brightness along any confusion line.

The total number of colors that a Protanope can discriminate is 17 (versus 150 for a normal trichromat). The confusion lines of a protanope converge to the point (x=0.747, y=0.253). Colors furthest from this point provide the greatest sensitivity to shifts in hue, particularly in the cyan. Maximum sensitivity occurs approximately at the neutral opponent response between the S and M cone fundamentals. The range of 480-515 nm is an important spectral band for color discrimination. Shifts in hue along a confusion line toward greater chroma (toward the cyan portion of the CIE locus) are beneficial. These shifts create greater separation between points on adjacent confusion lines and therefore better color discrimination. Protanopes are most sensitive to wavelength shift at about 495 nm, and can resolve a shift of about 2-3 nm. This sensitivity decays rapidly for departures from the peak. By contrast, a normal trichromat can resolve about 1 nm at 495 nm, and at least 2 nm throughout most of the visible.

Figure 13:
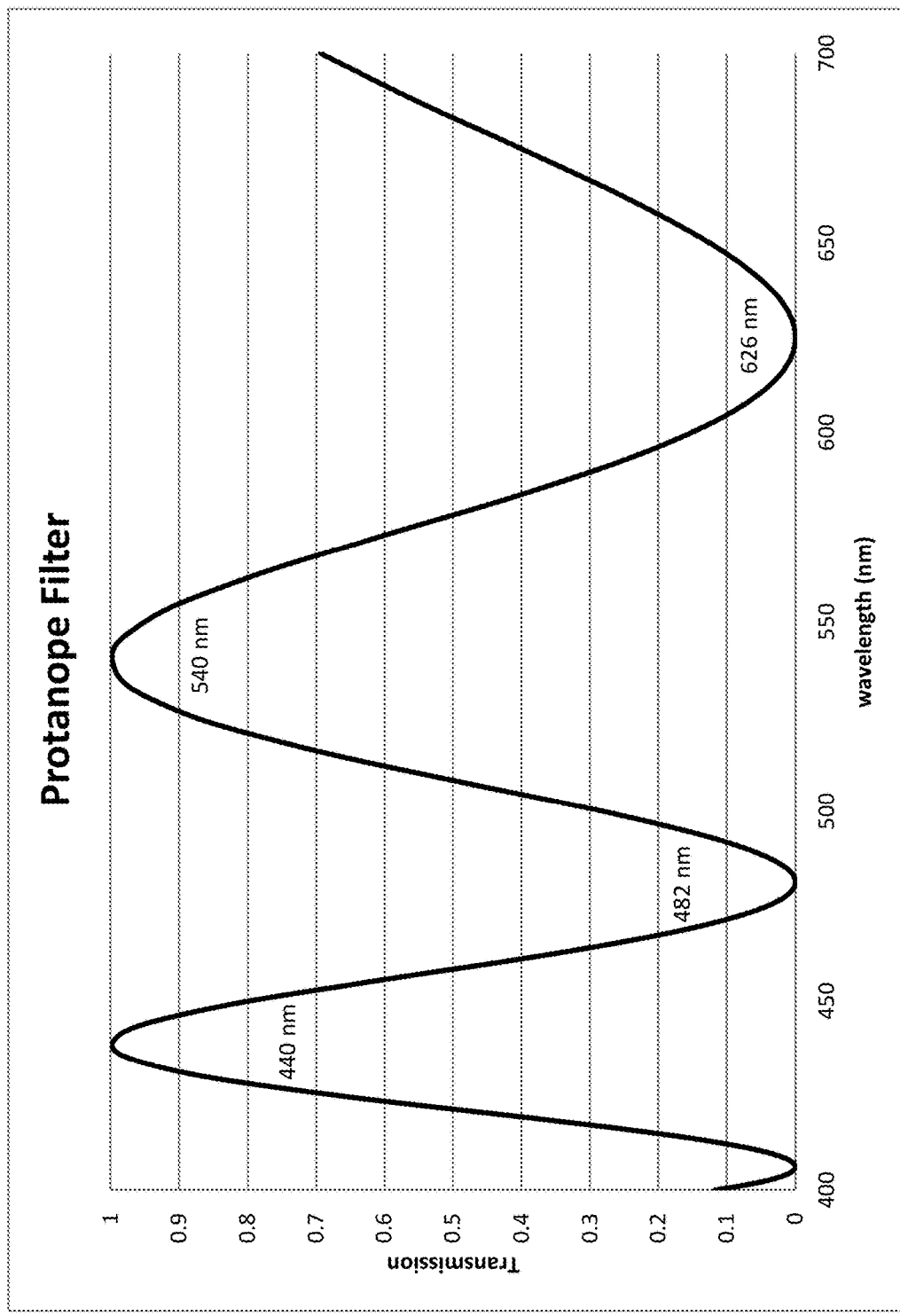
FIG. 13 shows the transmission spectrum of a filter as taught herein which might be used by a protanope.

Consider a filter delivering a two-peak transmission function, as shown in FIG. 13. It corresponds to a 4.0 wave polycarbonate retarder at 440 nm between parallel polarizers. The peak center wavelengths correspond approximately to peaks in the S and M cone fundamentals. The null between these wavelengths is in the long-wave blue, approximately where the neutral opponent response is. By greatly reducing the transmitted light near the neutral wavelength (near spectral cyan), the perceived hue is more dependent upon the relative balance between short-wave blue and green content in the input SPD. This tends to push the filtered SPD of natural objects closer to the locus, where color discrimination is better, while potentially distorting the hue of many objects. While narrow-band spectral-cyan objects would tend to become much darker, the occurrence of such objects in the natural world is very rare.

The Protanope sensitivity to hue shift at/near the green-red portion of the CIE locus is weak. It coincides with a confusion line due to absence of the M/L opponent signal. So, apart from selecting the peak center wavelengths to push the input SPD as far as possible toward the left portion of the locus, little can be done except to control perceived lightness. The peak achromatic sensitivity to brightness is given essentially by the M curve, which peaks at 542 nm. It decays to 50% at 502/586 nm, to 10% at 450/620 nm, and to 1% at 408/653 nm. So a Protanope is very sensitive to the brightness of green objects, with a response that is relatively similar to normal trichromats at shorter wavelengths, but is much different at longer wavelengths. With the absence of the L cone, longer-wave red objects appear much darker than they do for normal trichromats. A yellow object is perceived as only half the brightness of a green object of the same lightness, and an orange-red object is only 10% of the brightness of a green object of the same lightness. While the Protanope cannot discern any hue difference, they can exploit the achromatic pathway to discriminate between objects of similar lightness along the red/green locus. This of course comes with some ambiguity, since the lightness of an object is variable. So optimizing the green-red transmission profile requires some knowledge of the input data set of salient objects. The combination of the appearance of familiar objects with their lightness is another way that dichromats can discriminate color. For instance, a Protanope knows that a ripe tomato is red and an under-ripe tomato is green, and can assume that the darker tomato is relatively ripe.

Given the lack of color sensitivity, it may be beneficial to use a filter that controls the taper of the transmission throughout the green-red region to enhance contrast between more frequently occurring colors (e.g.) of the natural world. Given that the M cone provides little information past 653 nm, the filter can strongly attenuate longer wavelengths, in order to gain better discrimination in a band of shorter wavelengths that provide a greater richness of information. If the objective is to establish correspondence between brightness and color, it is also important to have an understanding of the lightness statistics of the input data set. The spectrum of FIG. 13 shows such a taper, with a 50% point of 579 nm, 10% at 605 nm, and 1% at 618 nm. By holding transmission high at the peak of the M curve, and tapering it to a minimum at 626 nm, the contrast sensitivity is enhanced in a key spectral range for natural objects. The consequence is some compression of the contrast at longer wavelengths, where longer-wavelength reds are all perceived as very dark. In practice, a PIF-based filter can be combined with the tint and wavelength dependent polarizing efficiency (also known as chromatic polarizing efficiency) of a polarizer to control the detailed taper of the transmission in the green-red.

With the peak center wavelengths selected, low spectral gradient filtering can be applied to adjust the relative amplitude of the blue and green peaks, by (e.g.) using a tinted polarizer. This can be done to select the neutral-point of the lens, and should have little impact on color discrimination. The line connecting the two peak center wavelengths of the filter on the CIE diagram, of optimum ratio, can yield a neutral point that may be undesirable to a normal trichromat, because it may appear too cyan. Since Protanopes will accept cyan hues as matches for white, there is significantly more freedom in selecting lens hue. The native color of the spectrum of FIG. 13 is x=0.248, y=0.416, which is fairly cyan/green for a normal trichromat, and is even above the neutral confusion line of a Protanope. As such, it may be beneficial to attenuate the green peak relative to the short-blue peak in order to shift the color coordinate to an intersection point of the neutral confusion line. This assumes that the objective is to obtain a neutral hue. Other lens hues can of course be selected to shift the color from the native hue to one that may be desired to satisfy certain viewer preferences. Moreover, a filter with blue and yellow peaks can be adjusted to produce a neutral white point as perceived by a normal trichromat. While general color discrimination of such a filter is non-optimum, in certain scene contexts it may be preferred.

Filters of the present invention need not have a color-balanced transmission function. As discussed above, a filter for CVD can have an acceptable white point that may not be desirable for one with normal color vision. Also, a filter could have a transmission function that compensates for the environment to create a more pleasing white point. This could apply to scuba diving or snorkeling, where the water filters the sunlight to effectively modify the illuminant. Similarly, task-specific filters may assign greater weight to resolving a particular color difference at the expense of white point. An example of this is a filter used in surgery (e.g. O2-Amp).

Lens Fabrication

Figure 10:
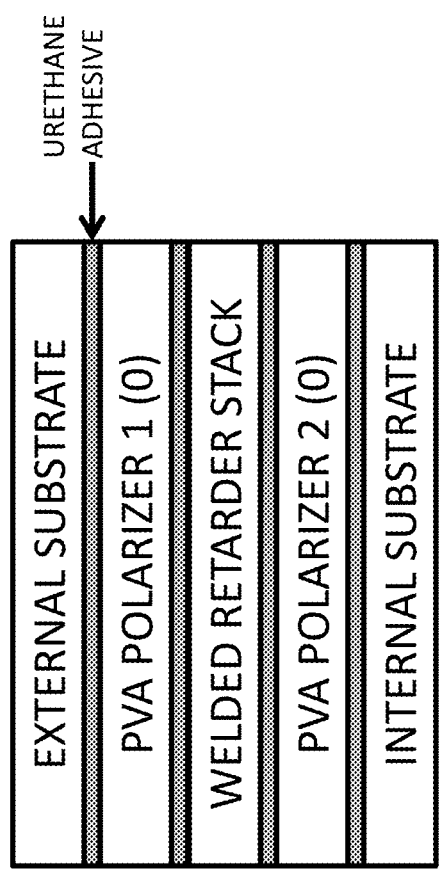
FIG. 10 shows a laminate used to make a color enhancement filter as taught herein.
Figure 11:
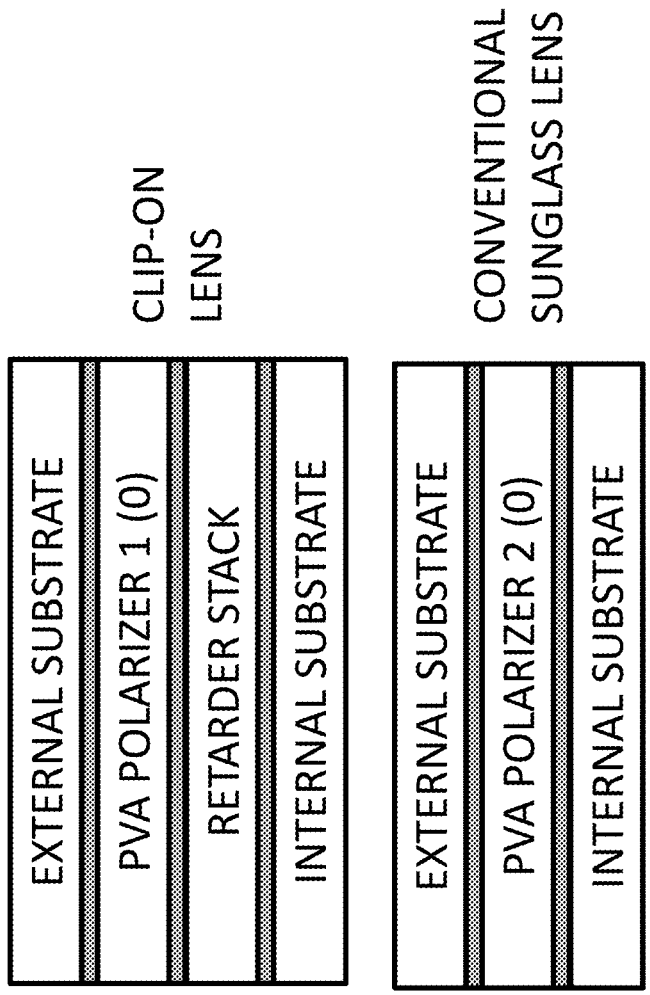
FIG. 11 shows a laminate used to make a filter as taught herein in order to provide a clip-on lens for a conventional sunglass lens.

Chroma enhancement eyewear lenses as taught herein can be fabricated using many of the same processes as more conventional polarizing lenses. The lens may be a stand-alone chroma enhanced sunglass filter, as shown using the laminate of FIG. 10. Alternatively, it may be a clip-on polarizing filter that produces chroma enhancement as a stand-alone filter, or when combined with another polarizing lens, as illustrated in the laminate of FIG. 11. In the event that the latter relies upon polarization from a separate lens, protective substrates on either side of the clip-on filter must preserve the state of polarization.

The high throughput fabrication of robust and flexible retarder stacks with low transmitted wavefront distortion (i.e. no non-uniform adhesive thickness issues), is best done using solvent bonding. For PC, this is best done using a ketone, which yields a reliable bond with small loss in retardation. Similar solutions also exist for olefin based retarders. The retarder stack can then be inserted into a functional filter stack as shown. This includes a low birefringence outer substrate to preserve the incident state of polarization (convex surface). Alternatively, a highly stretched substrate with optic axis parallel/perpendicular to the polarizer absorption axis can be used. Such products using polycarbonate and polyester are readily available (e.g. Mitsubishi Gas and Chemical, and Toyobo). In the event that a non-polarizing lens is desired, a quarter-wave retarder or highly stretched retarder can be added to the stack oriented at 45 degrees to the polarizer. This layer can either function as the outer substrate or it can be positioned between the outer substrate and the input polarizer. The polarizers can be any material used for conventional polarizing sunglasses, ideally using only the functional PVA layer (e.g. no bounding triacetyl cellulose (TAC) layers). The inner substrate can exhibit birefringence, as the SOP is already analyzed at this point. In some instances, injection molding or casting onto this substrate is required (for e.g. prismatic correction), so the material may need to be compatible with such a process.

Substrate optical preferences include high refractive index (preferably >1.5), low haze, low retardation (or controlled retardation), no crazing from post processes, and high optical surface quality. Some absorption of light (e.g. HEB) may be acceptable or even preferred to the extent that it facilitates meeting filtering objectives. Mechanical preferences include impact resistance, dimensional stability, flexibility, low weight, compatibility with thermoforming (Tg), compatibility with adhesive processes (e.g. high surface energy), compatibility with surface coatings (e.g. hard-coats), and reliability in harsh environments (e.g. high temperature, flux and humidity).

A final laminated lens stack, including outer/inner protective substrates, first/second polarizers, and the retarder stack, can be bonded using (e.g.) an optically clear thermoset urethane adhesive. Any adhesive that yields the desired optical, mechanical, and durability requirements, which is manufacturing friendly, is viable. This includes resins of acrylic, polyester, epoxy, silicone, or melamine. Manufacturing processes can use various cure methods, including thermosets, radiation cures, PSAs, two-part reactions, B-stage, and cyanoacrylates.

Figure 12:
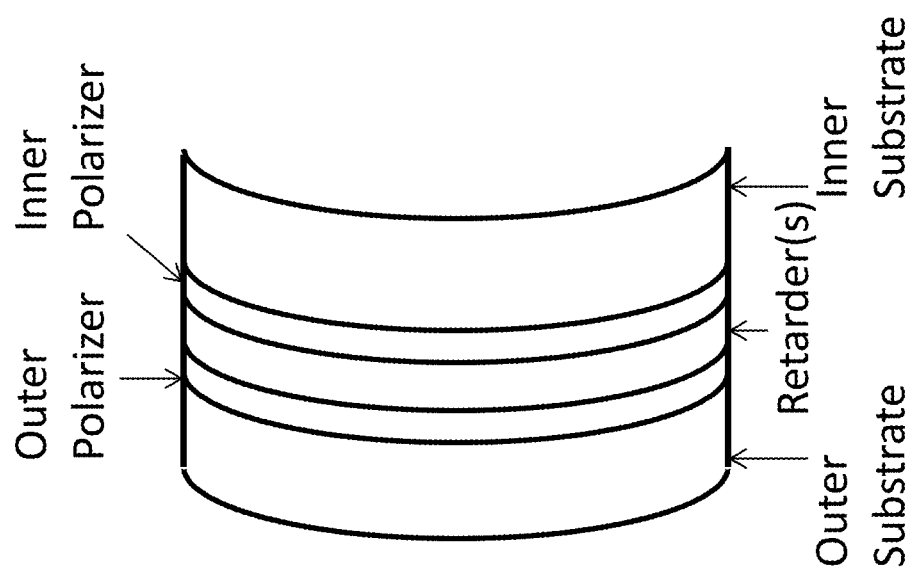
FIG. 12 shows a cross-section of a lens including a filter as taught herein.

The laminated stack can be die cut into finished part geometry for flat or one-axis curved product (e.g. lens filters, goggles or shields), or it can be cut into an appropriate standard geometry for further processing. A filter can be subsequently laminated between rigid substrates (e.g. glass) for certain applications. For eyewear lenses, the geometry is typically a circular disk, but it can also be of other geometries, such as elliptical, or a rectangular. A disk can be thermoformed into a blank of appropriate 3D geometry, as illustrated in FIG. 12, using conventional processes. This may include spherical (of various base-curvature), aspheric, toroidal, or elliptical. A formed blank can also be bonded to another element for further processing into prescription lenses. A blank may also be press-polished, and/or receive a particular desired spatial distribution of thickness for improved visual quality (e.g. prismatic correction). This process may include injection molding on the inner surface, or casting of a resin on either/both surfaces. Additional functional coatings, such as hard-coats, antireflection coatings, (isotropic or patterned) mirror coatings, dielectric filter coatings, hydro-phobic coatings, and oleo-phobic coatings can be applied in the usual fashion. These blanks can then be processed into finished lenses/eyewear using conventional processes.

For lens blanks using an injection/casting (overmolding) process, a thin functional blank can be fabricated with material subsequently cast on either side of it. A four layer retarder stack is typically 280 microns thick, though a thickness of 160 microns is also feasible. Given adhesive and PVA thicknesses, and perhaps a thin highly stretched layer encapsulating the functional structure, the overall blank thickness may be 600 microns or less. Such a wafer can be formed and then inserted into a casting process to form a lens blank of appropriate thickness.

Figure 14:
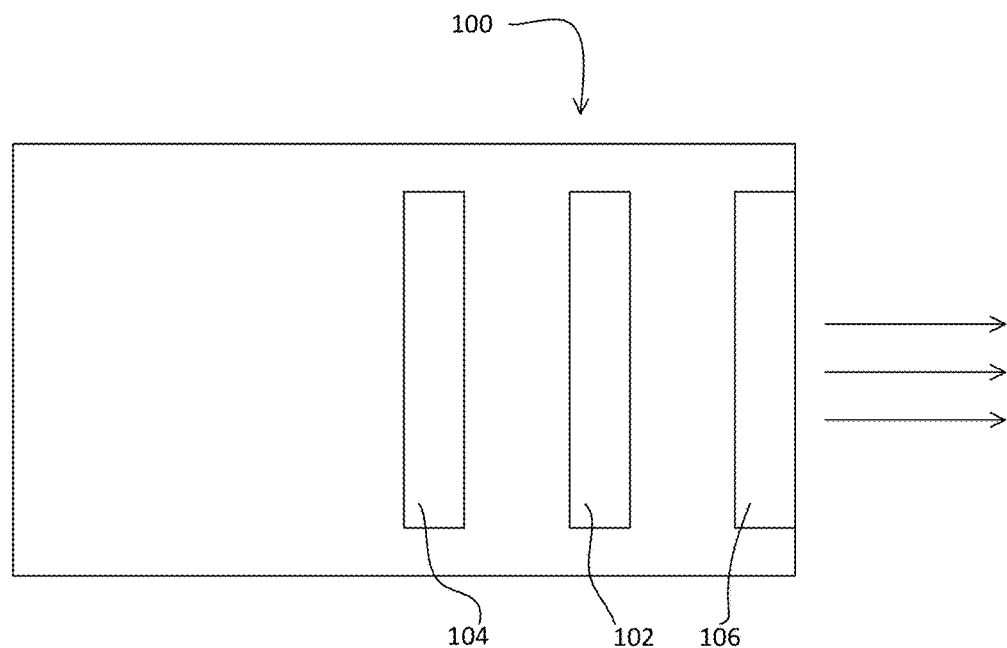
FIG. 14 shows a display system that employs a filter as taught herein.

The present invention describes a color enhancing polarization interference filter that can be used for visual enhancement in front of the eye, or at any appropriate distance that accomplishes the same function. It can also be used with other types of (electronic) image forming devices. In such a display system 100, shown in FIG. 14, a filter 102 can be placed between a light source 104 and a display 106, or it can be placed over a display device (on the side of the display viewed by the user), to modify the SPD for either backlit, self-emissive (e.g. OLED), or passive illuminated display devices. Benefits of such filtration can include improved color gamut, increased contrast, or ambient light rejection. For instance, a filter matched to a display SPD will pass lumens efficiently, while more strongly rejecting the SPD associated with illuminating glare.

Figure 15:
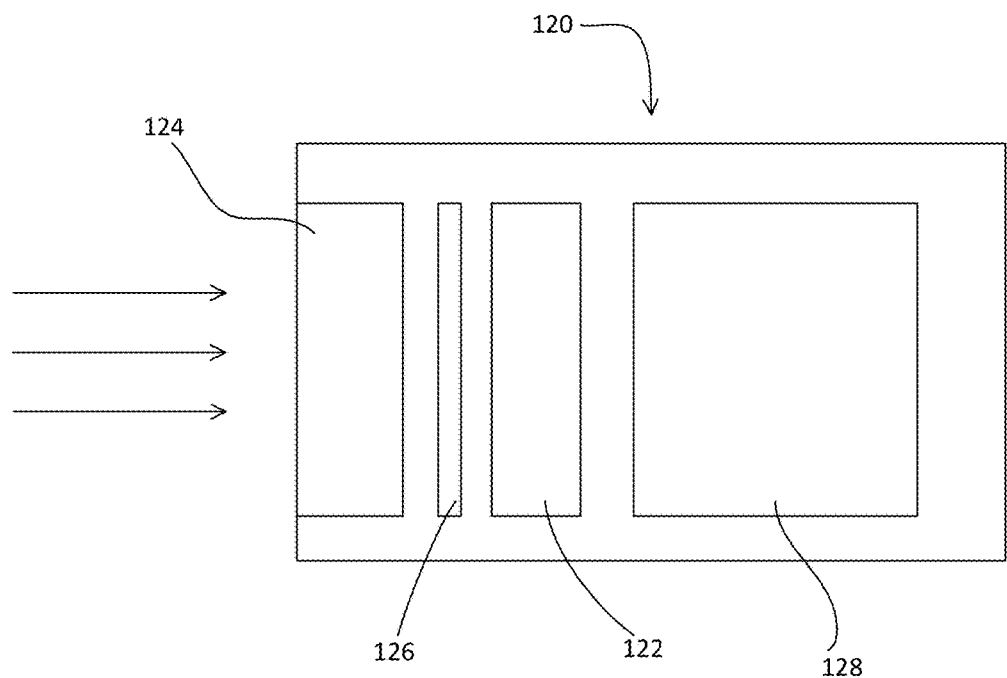
FIG. 15 shows an imaging system that employs a filter as taught herein.

The filter of the present invention can also be used in an imaging system 120 by placement in front of image capturing media (e.g. film), electronic sensor 122, or sensor array, as shown in FIG. 15. The system 120 is shown to include a lens 124, a color enhancement filter 126 (as described throughout), the sensor 122, and a processor 128. It will be understood that the 120 is shown and described herein in simplified fashion with many details and components omitted for ease of illustration. The function of the PIF is to assign weighting to particular wavelengths within the captured SPD. As in the visual case, such filtering can enhance colors, improve detection of boundaries, and increase the signal-to-noise ratio when properly optimized. An example of this can be camouflage detection.

The oscillating transmission functions achieved by the optical filters taught herein typically oscillate with unity amplitude and frequency determined by the "order" (number of waves of phase-difference) of the retarder. As shown in FIG. 1, this may mean that each of the maximums/peaks in the transmission curve are at the same amplitude and which may be at or near 100% transmission at that wavelength. Also, each of the minimums/valleys in the transmission curve are at the same amplitude and which may be at or near 0% transmission at that wavelength. In actuality, these valleys may be at or near 20% or less than the maximums, at or near 15% or less than the maximums, at or near 10% or less than the maximums, or at or near 5% or less than the maximums. As can be seen, in each of the conditions described in the previous sentence, the transmission at the peaks will be greater than four times the transmission at the valleys and in some of the cases/conditions described in the previous sentence, the transmission at the peaks will be greater than ten times the transmission at the valleys.

Further, the oscillating transmission functions may have a period that increases with increasing wavelength (due to the inverse wavelength, and Δn varying with wavelength as discussed above). Thus, when the transmission function is plotted versus wavelength (as shown in FIG. 1), the adjacent maximums are closer together (in wavelength) on the shorter end of the wavelength spectrum and further apart (in wavelength) on the longer end of the wavelength spectrum. This effect can be used by the designer in selecting desired peaks and valleys in the transmission spectrum. Thus, as shown in FIG. 1, peaks can be provided in the red and green with a valley in the yellow/orange, and a peak can be provided in the long-wave blue with valleys in cyan and high-energy blue. As a consequence of the nature of the oscillating transmission function of the filters disclosed herein, there will be additional minimums and maximums outside of the visible wavelength range. As but one example, most of the filters will have at least one minimum between 700 nm and 1400 nm. As an alternative to the peaks and valleys shown in FIG. 1, as shown in the Protanope Filter of FIG. 13, peaks can be provided in the blue and green with valleys in the high-energy blue, cyan, and red.

Another way of describing the net effect achieved by the optical filters using PIFs with uniaxial retarders (where N=2) to create oscillating transmission functions is that a passive filter is provided that passes desired (relatively-narrow) wavelength ranges, such as the wavelength ranges of the three primary colors (red, green, and blue).

It is believed that past use of PIFs emphasized the need to have N equal to 3 or greater in order to avoid the non-desirable sinusoidal transmission functions that would result from N=2. For example, double-notch PIFs have been proposed with 7 layers of retarders, to create N=8. However, with wide-fielding, such a PIF would require a minimum of 21 layers and be complex and expensive.

One of the motivations of developing the optical filters disclosed herein was seeking to design a color enhancement filter based on the use of inexpensive uniaxial film. The present invention accomplishes this with a simple filter construction capable of (e.g.) notching in the HEB, spectral cyan, and spectral yellow using a single oscillatory interference, which can also preserve neutrality and color uniformity with incidence angle. Also, without regard to uniaxial film, there has been a long-felt need for a color enhancement filter that was simple and inexpensive. Further, there has been a long-felt need for a color enhancement filter that produced the desired wavelength ranges and filtered out the undesired wavelength ranges. Others tried to achieve a selective filtering of wavelength ranges with dye filters. Unfortunately, such filters do not produce sufficiently low minimums at the optimum center wavelengths.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. An optical filter, comprising:
    a polarization interference filter (PIF), including at least:
        an input polarizer;
        one or more retarders; and
        an output polarizer;
    wherein the PIF has a transmission across the 400 nm to 700 nm spectrum that is substantially sinusoidal having minimums and maximums, and with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

2. An optical filter, including:
    an input polarizer;
    an input chromatic retarder;
    an output chromatic retarder;
    a neutral Polarization Control Unit (PCU) therebetween, including:
        one or more zero-order half-wave uniaxial retarders, wherein the polarization transformation by the PCU creates a net chromatic retardation that is substantially independent of angle-of-incidence; and
    an output polarizer;
    wherein the filter has a transmission across the 400 nm to 700 nm spectrum with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

3. An optical filter as defined in claim 2, wherein the input and output polarizers have parallel axes of polarization;
    wherein the chromatic retarders are composed of polycarbonate and each have a retardance (Γ) of 2.25 waves in the 505 nm to 555 nm range; and
    wherein the PCU provides rotation about an axis in the range of −19 to −24 degrees and an axis in the range of +19 to +24 degrees.

4. An optical filter as defined in claim 2, wherein the PCU includes an odd number of half-wave retarders.

5. An optical filter as defined in claim 4, wherein the PCU is a single half-wave retarder with the slow and fast axes of the retarder aligned at 0 degrees and 90 degrees with the orientation of a polarization axis of the input polarizer.

6. An optical filter as defined in claim 4, wherein the PCU is a compound half-wave retarder with three retarder layers and with the fast axis of: a first of the three retarder layers oriented at −30 degrees with an orientation of a polarization axis of the input polarizer, a second of the three retarder layers oriented at +30 degrees with the orientation of the polarization axis of the input polarizer, and a third of the three retarder layers oriented at −30 degrees with the orientation of the polarization axis of the input polarizer.

7. An optical filter, comprising:
    a polarization interference filter (PIF), including at least:
        an input polarizer;
        a retarder stack that generates only two output impulses from a polarized impulse input; and
        an output polarizer;
    wherein the PIF has a transmission across the 400 nm to 700 nm spectrum with a single maximum in the 610 nm to 680 nm range, a single maximum in the 520 nm to 555 nm range, and at least one maximum in the 455 nm to 480 nm range, and with a single minimum in the 485 nm to 515 nm range, a single minimum in the 565 nm to 590 nm range, and at least one minimum in the 400 nm to 450 nm range.

8. An optical filter as defined in claim 7, wherein a substantially neutral white-point is achieved.

9. An optical filter as defined in claim 7, wherein each of the minimums in the transmission spectrum is less than 20% of each of maximums.

10. An optical filter as defined in claim 7, wherein there is at least one minimum in the 700 nm to 1400 nm range.

11. An optical filter as defined in claim 7, wherein at least one retarder in the retarder stack includes solvent bonded retarder films.

12. An optical filter as defined in claim 7, wherein at least one retarder in the retarder stack includes at least one uniaxial stretched retarder film.

13. An optical filter as defined in claim 12, wherein the film includes polycarbonate.

14. An optical filter as defined in claim 12, wherein the film includes polyolefin.

15. An optical filter as defined in claim 7, wherein at least one of the polarizers include a chromatic dye that controls a color balance and overall hue of the optical filter.

16. An optical filter as defined in claim 7, wherein the optical filter is arranged as a laminated stack of layers.

17. An optical filter as defined in claim 16, wherein the polarizers include polyvinyl alcohol.

18. An optical filter as defined in claim 16, wherein the retarder stack is formed on glass.

19. An optical filter as defined in claim 16, wherein the retarder stack is formed on isotropic plastic.

20. An optical filter as defined in claim 16, wherein each of the layers of the laminated stack lie substantially in their own plane.

21. An optical filter as defined in claim 16, wherein each of the layers of the laminated stack is curved.

22. An optical filter as defined in claim 7, wherein each of the components of the optical filter is thermoformed.

23. An optical filter as defined in claim 7, wherein the optical filter is arranged for use by a person having color vision deficiency.

24. An optical filter as defined in claim 7, wherein the optical filter is arranged for use as a sunglass lens.

25. An optical filter as defined in claim 7, wherein the optical filter is arranged for filtering light before it is captured electronically.

26. An optical filter as defined in claim 7, wherein the optical filter is arranged as part of a display that displays images.

27. An optical filter as defined in claim 7, wherein the optical filter is arranged for filtering light provided to a human performing an activity.

* * * * *